United States Patent
Vrzic et al.

(10) Patent No.: US 9,288,772 B2
(45) Date of Patent: Mar. 15, 2016

(54) METHOD AND SYSTEM FOR SELF-ORGANIZING NETWORKS USING COOPERATIVE SENSING

(71) Applicant: Research In Motion Limited, Waterloo (CA)

(72) Inventors: Sophie Vrzic, Nepean (CA); Yongkang Jia, Ottawa (CA); Takashi Suzuki, Ichikawa (JP); Rene Waraputra Purnadi, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 261 days.

(21) Appl. No.: 13/867,754

(22) Filed: Apr. 22, 2013

(65) Prior Publication Data
US 2014/0315593 A1 Oct. 23, 2014

(51) Int. Cl.
| | |
|---|---|
| H04B 7/00 | (2006.01) |
| H04W 52/38 | (2009.01) |
| H04W 52/14 | (2009.01) |
| H04W 52/22 | (2009.01) |
| H04W 52/24 | (2009.01) |
| H04W 52/40 | (2009.01) |
| H04W 84/18 | (2009.01) |
| H04L 5/00 | (2006.01) |

(52) U.S. Cl.
CPC .......... *H04W 52/38* (2013.01); *H04W 52/143* (2013.01); *H04W 52/228* (2013.01); *H04W 52/241* (2013.01); *H04W 52/247* (2013.01); *H04W 52/40* (2013.01); *H04L 5/00* (2013.01); *H04W 84/18* (2013.01); *Y02B 60/50* (2013.01)

(58) Field of Classification Search
USPC ............... 455/522, 67.11, 68–70, 126, 127.1, 455/424, 426.1, 435.2, 436–444, 449, 450
See application file for complete search history.

(56) References Cited

U.S. PATENT DOCUMENTS

| | | | |
|---|---|---|---|
| 6,453,151 B1 * | 9/2002 | Kiang et al. | 455/67.11 |
| 6,859,831 B1 | 2/2005 | Gelvin et al. | |
| 7,920,512 B2 | 4/2011 | Maltseff et al. | |
| 2004/0180652 A1 * | 9/2004 | Jang et al. | 455/426.2 |
| 2006/0253570 A1 | 11/2006 | Biswas et al. | |
| 2010/0099449 A1 * | 4/2010 | Borran et al. | 455/501 |
| 2011/0053601 A1 | 3/2011 | Frederiksen et al. | |
| 2012/0079149 A1 | 3/2012 | Gelvin et al. | |
| 2012/0184321 A1 | 7/2012 | Baldessari et al. | |
| 2013/0003591 A1 * | 1/2013 | Novak et al. | 370/252 |
| 2013/0012191 A1 * | 1/2013 | Charbit et al. | 455/422.1 |

OTHER PUBLICATIONS

International Searching Authority, International Search Report and Written Opinion issued in connection with International Application No. PCT/US2014/033812, dated Aug. 29, 2014, 16 pages.

(Continued)

*Primary Examiner* — Dominic E Rego

(74) *Attorney, Agent, or Firm* — Fish & Richardson P.C.

(57) ABSTRACT

A method, network element and user equipment, where in one embodiment at a network element within a secondary cell for self-optimizing operation with a primary cell, the method transmitting using an initial transmit power from the network element; requesting feedback from sensors located near a location; receiving the feedback from the sensors; and adjusting a transmit power based on the received feedback.

12 Claims, 14 Drawing Sheets

(56) References Cited

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11); 3GPP TS 36.300 V11.5.0; http://www.3gpp.org; released date Mar. 2013, 209 pages.

3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11); 3GPP TS 37.320 V11.3.0; http://www.3gpp.org; released date Mar. 2013, 23 pages.

\* cited by examiner

METHOD AND SYSTEM FOR SELF-ORGANIZING NETWORKS USING COOPERATIVE SENSING

FIELD OF THE DISCLOSURE

The present disclosure relates to self-optimizing networks and in particular relates to cooperative sensing schemes for self-optimizing networks.

BACKGROUND

Self-optimizing networks (SON), also referred to as self-organizing networks, are networks in which user equipments (UEs) and evolved node B (eNB) measurements are used to automatically tune various parameters in the network.

In the Third Generation Partnership Project (3GPP), Long Term Evolution-Advanced (LTE-A), carrier aggregation was introduced in Release 10. With carrier aggregation, multiple component carriers may be allocated for both downlink and/or uplink transmissions. The use of home evolved node B (HeNB) cells, also known as femto cells, and pico cells within the same component carriers as the macro cell may introduce interference management problems.

As network operators continue to deploy small cells to serve more UEs and increase capacity, network planning becomes increasingly difficult. Manually configuring network nodes to the available component carriers in order to minimize interference may not be practical in certain situations due to the dynamically changing traffic demands. Further, having a fixed allocation of resources is inefficient since some nodes may be idle at given times while others may be heavily loaded. These interference management problems may be addressed through the SON functionality.

Further, in order to free up resources and to save power by not transmitting downlink broadcast channels when no UEs are available to be served, a dynamic approach of reconfiguring resources may be needed.

BRIEF DESCRIPTION OF THE DRAWINGS

The present disclosure will be better understood with reference to the drawings, in which.

DETAILED DESCRIPTION OF THE DRAWINGS

Figure 1:
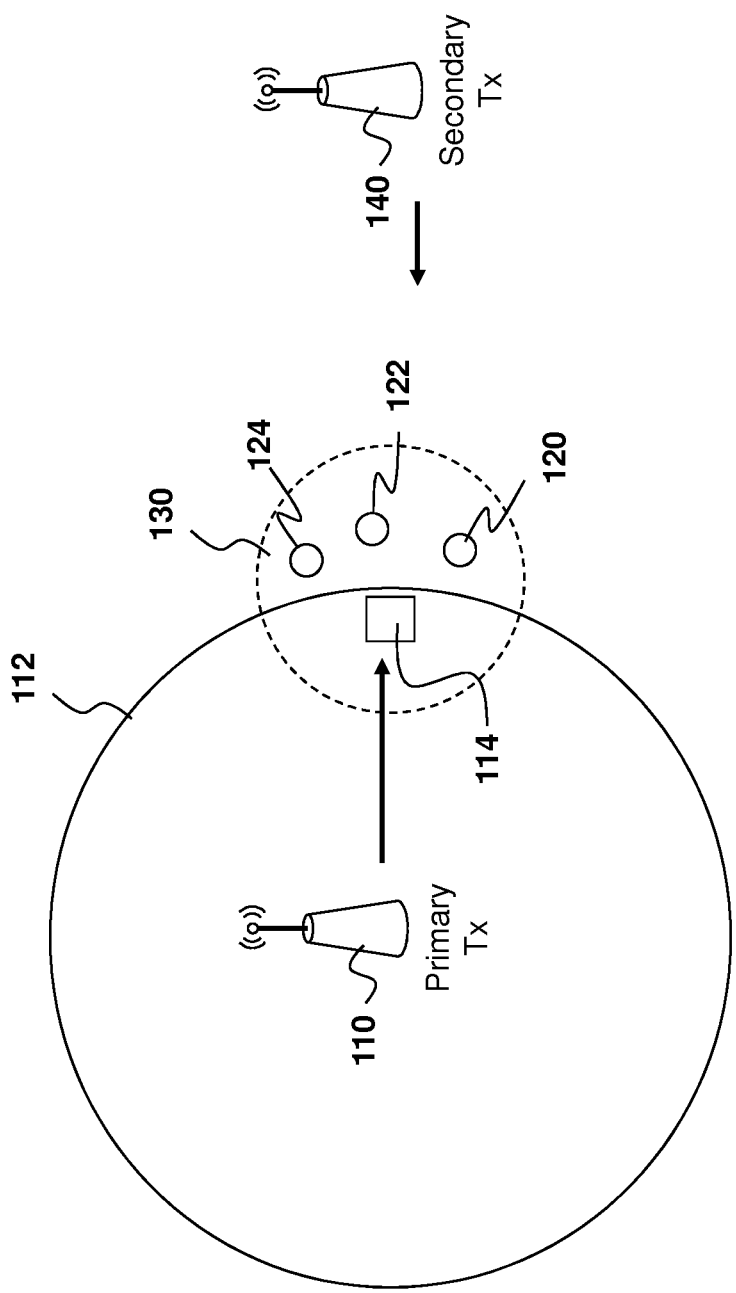
FIG. 1 is a block diagram illustrating secondary access in a shared spectrum.

The present disclosure provides a method at a network element within a secondary cell for self-optimizing operation with a primary cell, the method comprising: transmitting using an initial transmit power from the network element; requesting feedback from sensors located near a location; receiving the feedback from the sensors; and adjusting a transmit power based on the received feedback.

The present disclosure further provides a network element within a secondary cell for self-optimizing operation with a primary cell, the network element comprising: a processor; and a communications subsystem, wherein the network element is configured to: transmit using an initial transmit power from the network element; request feedback from sensors located near a location; receive the feedback from the sensors; and adjust a transmit power based on the received feedback.

The present disclosure further provides a method at a network element comprising: upon detecting uplink transmissions on a component carrier in a neighbor cell, requesting at least one of downlink or uplink component carriers from a macro cell; receiving activation of the at least one of downlink and uplink component carriers; and transmitting on the downlink component carrier.

The present disclosure further provides a network element comprising: a processor; and a communications subsystem, wherein the network element is configured to: upon detecting uplink transmissions on a component carrier in a neighbor cell, request at least one of downlink or uplink component carriers from a macro cell; receive activation of the at least one of downlink and uplink component carriers; and transmit on the downlink component carrier.

The present disclosure further provides a method at a network element comprising: receiving a request for a downlink component carrier from a small cell; providing an allocation of resources to the small cell; and informing user equipments of the small cell.

The present disclosure further provides a network element comprising: a processor; and a communications subsystem, wherein the processor and communications subsystem are configured to: receive a request for a downlink component carrier from a small cell; provide an allocation of resources to the small cell; and inform user equipments of the small cell.

The present disclosure further provides a method at a network element within a secondary cell for self-optimizing operation, the method comprising: activating the network element; transmitting utilizing an initial transmit power; and iteratively adjusting a transmit power based on a minimum difference between a measured signal to interference noise ratio and a target signal to interference noise ratio of primary cell user equipments.

The present disclosure further provides a network element within a secondary cell for self-optimizing operation, the network element comprising: a processor; and a communications subsystem, wherein the network element is configured to: activate the network element; transmit utilizing an initial transmit power; and iteratively adjust a transmit power based on a minimum difference between a measured signal to interference noise ratio and a target signal to interference noise ratio of primary cell user equipments.

The present disclosure further provides a method at a network element within a secondary cell for self-optimizing operation, the method comprising: activating the network element; transmitting utilizing an initial transmit power; collecting sensing statistics from user equipments within the coverage of the network element; and calculating, based on the collected sensing statistics, a transmit power for the network element and transmit powers for neighboring network elements.

The present disclosure further provides a network element within a secondary cell for self-optimizing operation, the network element comprising: a processor; and a communications subsystem, wherein the network element is configured to: activate the network element; transmit utilizing an initial transmit power; collect sensing statistics from user equipments within the coverage of the network element; and calculate, based on the collected sensing statistics, a transmit power for the network element and transmit powers for neighboring network elements.

The present disclosure further provides a method at a macro network element for self-optimizing operation, the method comprising: collecting sensing statistics from user equipments within the coverage area of small cells within a coverage area of the macro network element; calculating, based on the collected sensing statistics, a transmit power for the small cells; and adjusting transmit powers of the small cells based on the calculating.

The present disclosure further provides a macro network element for self-optimizing operation, the macro network element comprising: a processor; and a communications subsystem, wherein the macro network element is configured to: collect sensing statistics from user equipments within the coverage area of small cells within a coverage area of the macro network element; calculate, based on the collected sensing statistics, a transmit power for the small cells; and adjust transmit powers of the small cells based on the calculating.

The present disclosure further provides a method at a user equipment for providing analogue sensing feedback to a network element, the method comprising: sending a first resource element with a reference symbol having a fixed transmit power known to both the user equipment and the network element; and sending a second resource element carrying sensing information.

The present disclosure further provides a user equipment for providing analogue sensing feedback to a network element, the user equipment comprising: a processor; and a communications subsystem, wherein the user equipment is configured to: send a first resource element with a reference symbol having a fixed transmit power known to both the user equipment and the network element; and send a second resource element carrying sensing information.

While the present disclosure is described below with regard to the 3GPP LTE-A architecture, other architectures are possible and the present disclosure is not limited to any particular architecture. In particular, any network using SON techniques may be used with the embodiments provided herein.

In cognitive radio systems, a primary system is licensed to use a spectrum and a secondary system opportunistically attempts to share the same spectrum without adversely affecting the primary system. In order to share spectrum, the radio network node may learn about the environmental conditions and may adapt to the changing environments. In such cognitive radio systems, sensing nodes may be distributed throughout the coverage area of the primary system and can provide information about the environment conditions. The knowledge of the environment is then stored in a database that can be accessed by a cognitive radio node as required.

In one approach, sensors may feedback actual sensing data such as the measured signal to interference noise ratio (SINR) of the primary user. The sensing data from each of the sensors may then be combined by the receiving node to obtain channel occupancy decisions. This approach is called data fusion.

Alternatively, sensors may feedback the channel occupancy decision to the receiving node, which then uses the results from all sensors. This approach is called decision fusion.

The data fusion approach provides better performance than a decision fusion approach in some embodiments. However, since each sensor must feedback raw sensing data, the improved performance may come at the expense of increased signaling overhead. Thus, in order to maximize performance in the sensing scheme while minimizing sensing feedback overhead, a low overhead sensing feedback scheme is provided herein.

Dynamic reconfiguration is typically applied in cognitive radio systems, where sensing nodes are used to sense available channels before transmitting. For example, in one scenario, sensing can be used to obtain channel occupancy decisions for secondary access in television white space (TVWS). Cooperative sensing involves the use of multiple sensors to obtain improved reliability in channel occupancy decisions. Further, with appropriate sensing measurements, cooperative sensing can also be used to adjust transmit power of the secondary transmitter in order to control the interference to the primary receivers in the shared spectrum.

In other embodiments, the techniques used in cognitive radio systems to learn and adapt can also be applied to LTE-A networks, for example. These techniques can enhance SON by optimizing component carrier allocation and operating parameters in order to manage interference among different network nodes. Such network nodes, for example, may include eNBs, HeNBs and pico cells, among others. The same framework can then be used in future systems to manage new component carriers within shared spectrum if such shared spectrum is available.

In order to obtain information for sharing spectrum, the network nodes require information about the radio environment at a cell edge. A sensing device is therefore needed at the cell edge. In cognitive radio systems where the primary system is not LTE-A, a dedicated sensing node may be placed at the cell edge of the primary system. In an LTE system, a UE or multiple UEs may provide the information used to assist in the implementation of SON. In both cases, cooperative sensing, which combines sensing information from multiple sensing nodes, can be used.

Thus, for example, in an LTE-A network, cooperative sensing may be used to control operating parameters of small cells including pico cells or HeNBs that are operating in the coverage area of the macro eNB and may be interfering with a macro eNB or with other small cell nodes. In such a scenario, the small cell nodes can be the secondary users and the macro eNB can be the primary user in one embodiment. In an alternative embodiment, the macro eNB can be secondary user and the small cells can be primary users.

Since the sensing information collected depends on the scenario in which it is used, a flexible cooperative sensing scheme is provided in the present disclosure.

Thus, various embodiments are provided below to address various issues with cooperative sensing. Such issues include how LTE-A systems can use shared spectrum with a primary system when the primary system is not an LTE system by making use of the cooperative sensing. A further issue is how to implement SON in LTE-A system and beyond when the shared spectrum is between a macro eNB and a small cell. A third issue is how to implement SON in LTE-A systems and beyond where the shared spectrum is between small cell nodes in a coverage area of a macro eNB. Further, issues involve the minimizing of feedback overhead in LTE-A and beyond systems.

Cooperative Sensing for Secondary Access in Shared Spectrum

In one embodiment of the present disclosure, cooperative sensing may be used to determine when and how to use the spectrum shared by both an LTE system and a non LTE system. In this embodiment, the secondary system is an LTE-A system and the primary system is not LTE. For example, the primary system may be a TVWS.

Reference is now made to FIG. 1. As seen in FIG. 1, a primary transmitter 110 has a region 112 containing a primary receiver 114. The primary transmitter needs to guarantee a certain quality of service to primary receiver 114. In this regard, sensing nodes 120, 122 and 124 in the example of FIG. 1 are provided near the boundary of the reception area of primary transmitter 110. Such sensors may be in a region 130 that is correlated with the primary receiver 114.

In this case, sensing nodes 120, 122 and 124 are located near the cell edge of the primary system and provide sensing measurements to a secondary transmitter 140. From the feedback collected, the secondary system can determine which part of the shared spectrum is available and what transmit power can be used in order to ensure the quality of service of the primary system.

The embodiment of FIG. 1 provides a way to collect and process sensing information to address the tradeoff between overhead and performance. The embodiment weighs the sensing information by the quality of the sensing measurement, which may be an SINR value or path loss to the serving node. In one embodiment, an analog feedback channel as described below may be used in association with the embodiment described herein.

In particular, as known in shared spectrum systems, a secondary system is allowed to operate in bands allocated to a primary system as long as the interference to the primary system is properly managed. Cooperative sensing can be used to optimize the operating parameters of the secondary access nodes in the shared spectrum.

For example, in the case where the shared spectrum is TVWS, the primary transmitter is a TV broadcaster. The secondary system may be an LTE-A network node. In order to ensure the operation of the primary system is not severely affected, a spectrum sensor that is capable of measuring the primary system may be located at the edge of the coverage area of the primary system as described above.

Sensors 120, 122 and 124 in the present embodiment may be dedicated sensors or may be UEs that are capable of measuring the primary signal.

Thus, primary receiver 114 has a minimum required signal to interference noise ratio (SINR), represented by $SINR_{req}$. If a secondary transmitter is allocated on the same frequency band for opportunistic transmissions, the transmit power of the secondary transmitter must be low enough to ensure harmful interference to primary users is avoided. In one embodiment, the transmit power for the secondary transmitter can be calculated using parameters obtained from a spectrum manager or radio environment database.

However, a transmit power calculation using propagation models to estimate the path loss may result in large estimation errors when used in actual radio environments. Currently, a margin may be applied to ensure that a minimum required SINR of the primary receiver at the edge of the coverage region is achieved. However, large estimation errors require a large margin for the secondary transmitter, leading to inefficient spectrum usage. A more efficient transmission power calculation for the secondary transmitter may achieve improved spectrum utilization.

In accordance with one embodiment of the present disclosure, once the secondary transmitter begins to transmit, the SINR at the primary receiver can be estimated using measurements from sensors that are located near the primary receiver 114. The sensing measurements may include the received powers of the primary and secondary transmitters and the remaining interference plus noise values or any parameters that can be used to estimate the SINR at the primary receiver. The difference between the estimated SINR and the required SINR can then be used to update the transmit power of the secondary transmitter.

A corrected and more accurate transmit power of the secondary transmitter can be represented as shown in equation 1 below.

$$P^{(S)} = P_0^{(S)} + \widehat{SINR} - SINR_{req} - p\sigma_E \quad (1)$$

In equation 1 above, $P_0^{(S)}$ is the initial transmit power of the secondary transmitter that is calculated by the spectrum manager using the parameters from the radio environment database, and $\widehat{SINR}$ is the estimated SINR, which is calculated in accordance with equation 2 below.

$$\widehat{SINR} = \hat{S} - \hat{I} - (I+N) \quad (2)$$

The estimated power of the primary and the secondary transmitters at the primary receiver is denoted as $\hat{S}$ and $\hat{I}$, respectively. The remaining noise plus interference is represented by I+N. Such scales of power or power ratios are provided in logarithmic units such as dBm or dB.

Since there are errors in the SINR estimation, the calculated transmit power correction includes a margin in order to control a probability of error to the desired value. The margin is proportional to the standard deviation of the estimation process and is represented by $q\sigma_E$ in equation 1 above, where q is a constant scaling factor and $\sigma_E$ denotes the standard deviation of the estimation error.

In order to estimate the SINR at the primary receiver, each sensor that is nearby the primary receiver independently measures the signal from the primary and the secondary transmitters. This measured value is then compared with the calculated value using the parameters obtained from the spectrum manager or radio environment database. The difference between the measured and the calculated signal power of the primary is given by the equation 3.

$$\delta_{S,k} = \tilde{S}_k - \tilde{S}_k^{SM} \quad (3)$$

In equation 3, $\tilde{S}_k$ represents the calculated signal power of the primary transmitter at the primary receiver. $\tilde{S}_k^{SM}$ is the measured power of the primary.

Similarly, the difference for the secondary transmission is given by equation 4 below.

$$\delta_{I,k} = \tilde{I}_k - \tilde{I}_k^{SM} \quad (4)$$

In equation 4 above, $\tilde{I}_k$ represents the calculated signal power of the secondary transmitter at the primary receiver. $\tilde{I}_k^{SM}$ is the measured power of the secondary.

Taking into account the measurements from the $N_S$ sensors, the estimated signal strength of the primary transmitter at the primary receiver is given by equation 5:

$$\hat{S} = \hat{S}^{SM} + \sum_{k=1}^{N_s} w_k \delta_{S,k} \quad (5)$$

The estimated signal strength of the secondary transmitter at the primary receiver is given by equation 6:

$$\hat{I} = \hat{I}^{SM} + \sum_{k=1}^{N_s} w_k \delta_{I,k} \quad (6)$$

The weight $w_k$ in equations 5 and 6 above represents the confidence in the sensing measurement.

In the case that there is only one sensor, k=1, and the difference in the enhanced SINR estimate and the required SINR is given by the equation 7:

$$\widehat{SINR} - SINR_{req} = w_k(\delta_{S,k} - \delta_{I,k}) \quad (7)$$

In one embodiment, the confidence value can be inversely proportional to the distance to the primary receiver. Only those sensors that are within a maximum distance of the primary receiver are selected to perform the sensing measurements, which can be expressed in terms of equation 8 below:

$$w_k = \frac{w}{d_k} \quad (8)$$

In equation 8 above, $d_k$ is the distance between sensor k and the primary receiver.

In an alternative embodiment, the weight at the sensor can be proportional to the correlation between the measurements at the sensor and the primary receiver. In this case, the weight may be written in accordance with equation 9 below:

$$w_k = w\rho_k \quad (9)$$

In equation 9 above, $\rho_k$ is the correlation between the SINR measurement at the primary receiver and sensor k. The maximum distance to the primary receiver, in this case, may be defined as the de-correlation distance, which is the distance where the correlation becomes 0.5.

Substituting the expression for the weight into the equation for the SINR correction gives equation 10 below.

$$\widehat{SINR} - SINR_{req} = cw_k(\delta_{S,k} - \delta_{I,k}) = cw_k \Delta_{SINR,k} \quad (10)$$

The scaling factor c can be used to control how much of the calculated correction is actually used to compensate the SINR.

If there are multiple sensors then the equation may be generalized in accordance with equation 11 below:

$$\widehat{SINR} - SINR_{req} = c \sum_{k=1}^{N_s} w_k \Delta_{SINR,k} \quad (11)$$

Since the weight at each sensor depends on the reliability of the estimates obtained from the sensors and the sensors may obtain sensing measurements at different times, the reliability may also depend on delay between the measurement time and the actual reporting time. This additional scaling can either be performed at the node collecting the sensing results or may be performed by the sensing node during sensing feedback.

Figure 2:
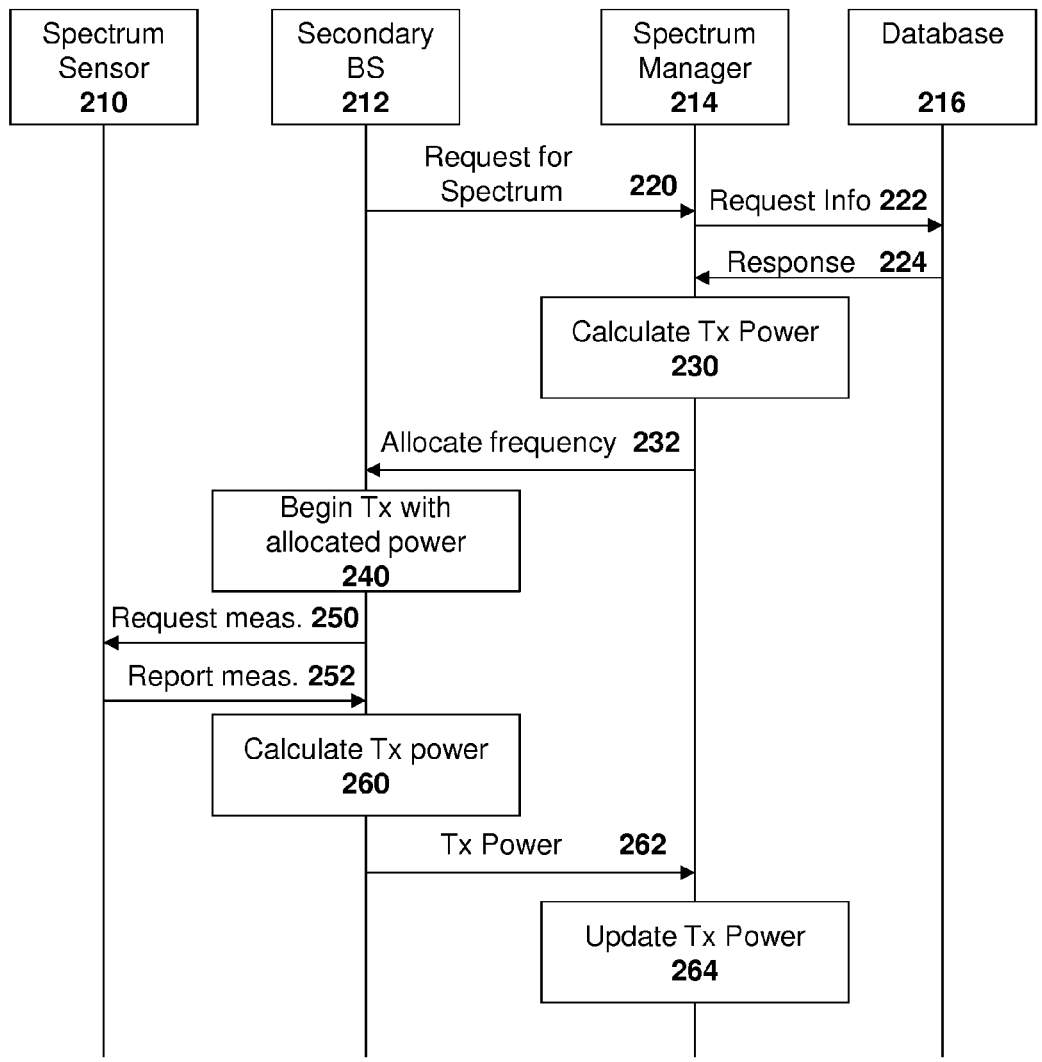
FIG. 2 is a data flow diagram showing a process for obtaining a component carrier and optimizing maximum transmission power in a shared spectrum.

Reference is now made to FIG. 2, which shows a procedure for updating the transmit power allocation. As seen in FIG. 2, a spectrum sensor 210 communicates with a secondary base station 212. Further, a spectrum manager 214 communicates with a secondary base station 212 and also with a database 216.

The process of FIG. 2 starts with secondary base station 212 requesting spectrum from spectrum manager 214, as shown by message 220. In this case, a secondary base station 212 may be an LTE-A eNB that is requesting additional resources in the shared spectrum such as for a TVWS. The sensing nodes may be either dedicated sensing nodes or may be UEs that are capable of sensing the primary signal at the shared band. In either case, the sensing nodes are capable of communicating with the LTE-A eNB.

Spectrum manager 214 may be an entity located at the network side within the LTE-A network. For example, it may be located at the eNB.

Database 216 is accessible by the eNB requesting the resources and other eNBs within the LTE-A network. It is also accessible to all nodes that are allowed to operate in the shared band as secondary users.

When the eNB determines that it requires additional spectrum, it sends a request to the spectrum manager, as shown with message 220. The spectrum manager 214 retrieves the information from database 216 to determine which portion of the band is available. This is shown with request 222 and response 224.

The spectrum manager 214 may then calculate the transmit power allowed by secondary base station 212, as shown by block 230, and then send allocation information to the requesting node, as shown by message 232. The allocation information may include the frequency for the spectrum being allocated, as well as a maximum transmit power.

Once the requesting node, in this case secondary base station 212, receives the allocation information of message 232, it begins to transmit on the allocated frequency.

In order to optimize the operating parameters, the secondary base station 212 transmits a multicast message containing sensing events. The sensing events determine the type of sensing to be performed and the conditions that satisfy the event. For example, an event can be described by the condition that the sensor is within a specified distance of some reference location and by specifying the primary signal to measure, which includes the frequency band and the type of transmission.

In one embodiment, the sensing events may be defined as a measurement event. In this case, the measurement configuration can be used to set the sensing event to the secondary node. The sensing information from the sending nodes may also be signaled to the secondary node using a measurement report.

Thus, referring again to FIG. 2, the beginning of the transmission is shown at block 240 utilizing the allocated power. A measurement request is then sent to the spectrum sensor 210, as shown by message 250 and the reported measurements are provided in a response message 252.

Based on receipt of the measurement report message 252, the secondary base station 212 calculates the transmit power, as shown by block 260 and provides this transmit power to the spectrum manager 214, as shown by message 262.

Spectrum manager 214 may then update the transmit power based on the feedback, as shown by block 264. The spectrum manager may then provide a new maximum transmit power back to secondary base station 212 to update the allocated power for transmission (not shown).

In an alternative embodiment, the sensing feedback of report 252 may be sent from spectrum sensor 210 to the spectrum manager 214 and the spectrum manager 214 may then calculate the updated transmit power.

In one embodiment, if the transmission power of the primary transmission never changes, such as for a television broadcast, the sensor may measure the same secondary transmit power and no additional sensor readings are needed. In this case, the transmission power of the secondary transmitter may be stored in the database and becomes the initial secondary transmission power and may not, in this case, need to be adjusted.

SON for Small Cell Deployment in LTE-A: Macro and Small Cell Nodes Share Spectrum In a further embodiment, the primary system and the secondary system can be either LTE-A systems or LTE-A and beyond systems. The small cell node may share the same carrier as the macro eNB. In a first embodiment, the macro eNB can be the primary user of the carrier and the small cell node is the secondary user of the carrier. In this case, the small cell node may determine the optimal transmit power to ensure that it does not adversely affect the macro UEs.

In a further embodiment, the small cell node may be the primary user and the macro eNB may be the secondary user. In this case, the macro is assumed to have multiple carriers. One carrier may be used by the macro eNB to communicate with the small cell node. Another is then allocated to the small cell node for its operation. If the small cell node is underutilized then the macro eNB can reuse the assigned carrier. Also, the macro eNB can determine the optimal transmit power to serve cell-center UEs to ensure quality of service for the small cell UEs.

In either case, cooperative sensing from UEs can be used in order to determine optimal component carriers and transmit powers for operation. If a macro has multiple carriers, the small cell node may determine the optimal transmit power for each carrier. The small cell can then select or request a carrier which allows the highest transmit power.

Further, activation and de-activation of the small cell node are provided in some embodiments in order to improve spectrum utilization.

Thus, cooperative sensing techniques may be used based on the SON approach that can be applied to a heterogeneous network deployment. As indicated above, in one scenario the primary transmitter may be a macro cell eNB and the secondary transmitter may be a small cell node such as a femto cell HeNB or a pico cell node. The procedure for updating the maximum transmit power of the small cell node can be an iterative process that uses feedback from sensors or UEs to gradually converge on a desired SINR. In this case, the macro eNB may reuse component carriers allocated to the small cell node as long as it does not cause too much interference to the UEs associated with the small cell node. The small cell node could also ensure that it does not cause too much interference to UEs associated with the macro eNB. Downlink and uplink component carrier allocation procedures are discussed separately below.

Downlink Component Carrier Allocation

Figure 3:
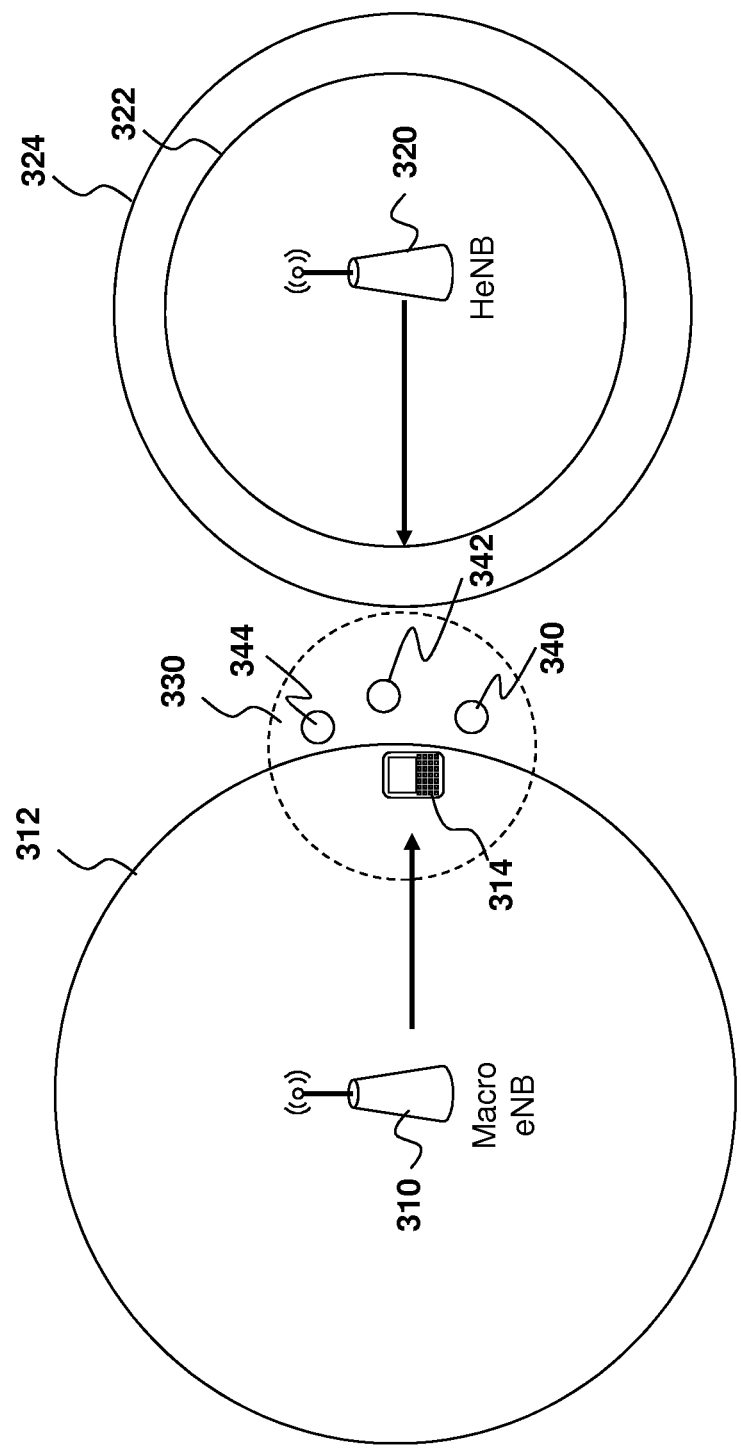
FIG. 3 is a block diagram showing cooperative sensing for self-organizing networks in LTE-A.

The measurements of actual SINR at the edge of the macro coverage area and the small cell node may be measured by sensing UEs that are near the cell boundary. The measured SINR can be compared with the required (desired) SINR and the difference may be used to adjust the maximum transmit power of the small cell node. Reference is now made to FIG. 3.

As seen in FIG. 3, a macro eNB 310 includes a coverage area shown by reference 312. A cell edge UE 314 is served by macro eNB 310. In one embodiment of FIG. 3, the coverage area 312 is a current coverage and not an absolute coverage and thus, a small cell such as HeNB 320 may use the same carrier. The HeNB 320 has a coverage area shown by reference 322 as well as a buffer zone 324.

In a region containing sensors that are correlated with the primary receiver, as shown by reference numeral 330, various sensors may exist which collect information. Such sensors are shown with reference numerals 340, 342 and 344. In one embodiment, sensors 340, 342 and 344 are UEs, but in other embodiments some or all of sensors 340, 342 and 344 may be fixed or non-UE sensors.

The initial transmit power of the small cell node 320 may be defined by a network or a spectrum management or radio resource management entity at the macro eNB 310 using parameters that are in the radio environment database. Alternatively, the transmission may begin with a default power level.

Once the small cell 320 begins to transmit, the network may request sensing feedback from sensors that are near a specified location, and are provided within region 330. Region 330 is about a location of the macro cell edge UE 314.

Sensing feedback is received by the network, and if a plurality of sensors is used, a plurality of sensing measurements may be received. The sensing measurements may be assigned a weight, depending on the confidence of the sensing measurements. For example, the weights of each sensing measurement may be determined by a correlation of SINR measurements between the sensors and the reference UE. Alternatively, a weight could be based on the distance to the specified location or may be scaled by the measured SINR of the primary transmitter which, in the example of FIG. 3, is the macro eNB 310.

In some cases, the embodiment of FIG. 3 may be reversed such that the small cell may be the primary cell and the macro cell may be secondary cell.

In accordance with the present embodiment, a series of iterative steps may be used to find an SINR that is close to a desired or required SINR. At iterative step n, the weighted average SINR estimation may be calculated as provided in equation 12 below.

$$\widehat{SINR}_n = \sum_{k=1}^{N_s} w_k \widehat{SINR}_{k,n} \tag{12}$$

As seen in equation 12, the weighted average is the calculation of the SINR times the weight attributed to the sensor added throughout all of the sensors.

The transmit power of the secondary transmitter, in this case, is given by equation 13 below.

$$P_{S,n+1} = P_{S,n} + c(\widehat{SINR}_n - SINR_{req}) \tag{13}$$

In accordance with equation 13, the power at a time interval is therefore the power at the previous time interval plus a constant c times the difference between the estimated SINR and the required SINR.

Figure 4:
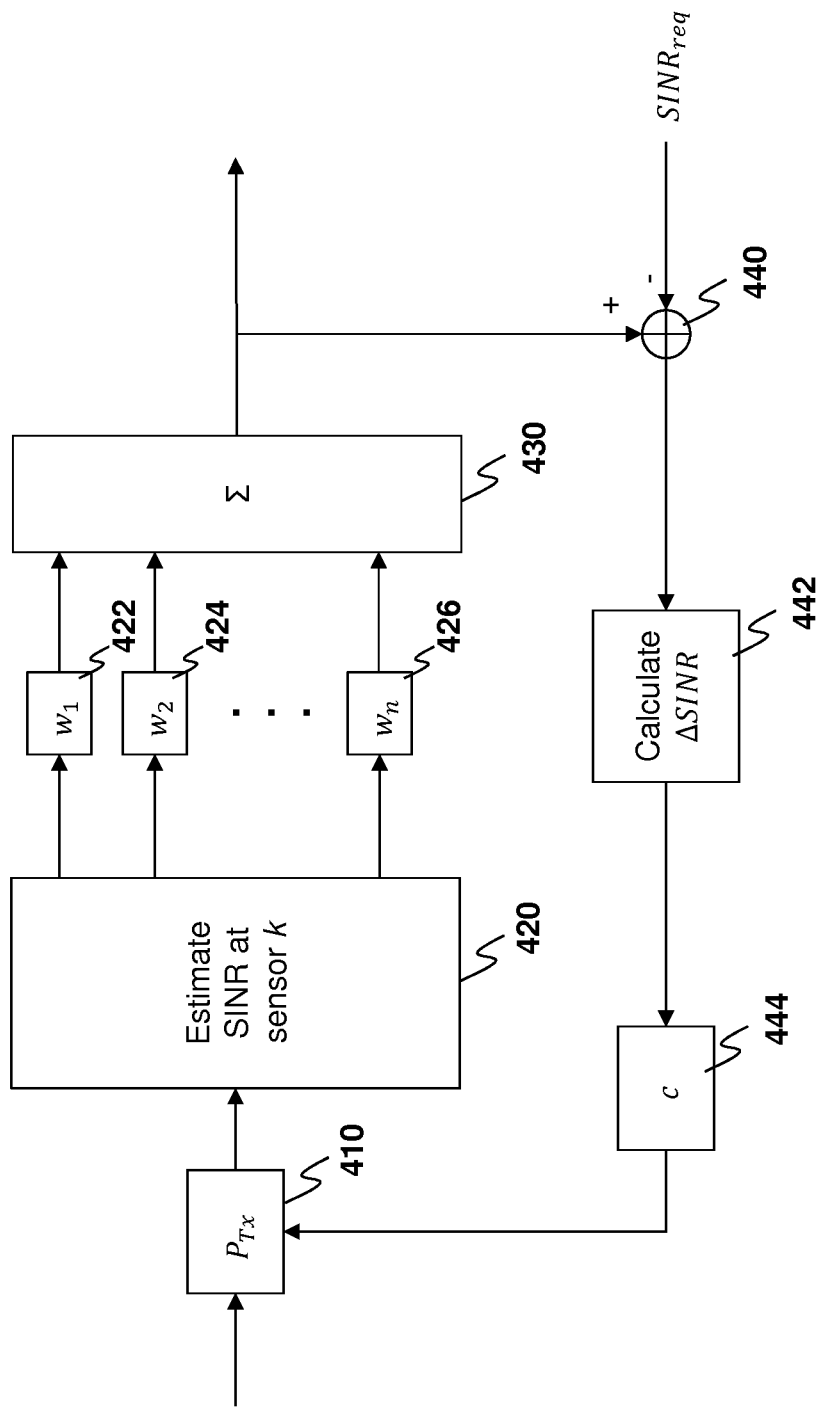
FIG. 4 is a block diagram of a iterative process for optimizing transmission power.

The iterative process of equation 13 is shown with regard to FIG. 4. As seen in FIG. 4, block 410 provides the power of the transmitter. This is then fed through a system having an estimated SINR for each sensor k which is then weighted with an appropriate weight for the sensor. The estimated SINR is shown by block 420 and the weights for each of the individual sensors are shown with blocks 422, 424 and 426 in the example of FIG. 4.

The weighted, estimated SINRs are then added together in block 430 and the required SINR is then subtracted from the results of block 430 at block 440.

After the subtraction of block 440, a delta SINR is calculated, as shown by block 442, and this is multiplied by a weighing factor or constant at block 444. The output from block 444 is then provided back to block 410 to iteratively change the transmission power of the cell up or down based on the estimated SINR versus the required SINR.

A similar approach may be used when the small cell node is the primary user and the macro eNB is the secondary user.

Further, if the small cell is close to a second macro eNB then the small cell must also ensure that the Quality of Service at the cell edge UEs of the neighboring macro eNB is also satisfied. This may be achieved by using the above process for the neighboring macro eNB. Since the Quality of Service must be satisfied for all the neighboring macro eNBs, the procedure may be applied for the closest macro eNB or for one with the highest constraints.

Uplink Component Carrier Allocation

For the uplink, small cell nodes may perform sensing instead of UEs in order to determine when to come out of a standby state and activate a new component carrier. The idle small cell node may make periodic uplink measurements on uplink component carriers used by neighboring nodes to determine if the received power of the uplink transmissions of nearby UEs is above a given threshold.

Information about uplink component carriers may be obtained from the network such as from an operations and administrative (O&A) system, spectrum management or radio resource management entity or radio environment database. The sensing event may be sent by a macro eNB using an over-the-air broadcast message or may be sent over a backhaul connection to neighboring nodes.

If an idle small cell node detects UEs transmitting on a component carrier used by a neighbor node then the small cell node can move to an active state by sending a request for a downlink and/or uplink component carrier. Once the small cell node is activated and begins transmitting on the downlink component carrier, UEs may then begin making neighbor cell measurements. If the UE is in the coverage area of the small cell, the UE may then be allocated the component carrier used by the small cell node.

The macro eNB may send a request to the idle small cell node to measure uplink transmissions of UEs on the edge of the small cell in anticipation of handover or offloading to the small cell node. For example, a request may include events that can be used to trigger an activation of a new component carrier by one of the small cell nodes. The component carrier activation event may be defined as a request to measure the signal strength of the set of resource blocks that have been assigned to a cell edge UE. If the signal strength is greater than a threshold then a component carrier activation request may be triggered for the small cell node.

A measurement request to the small cell node may be sent at the same time as an uplink grant to the UE. Since the small cell node measures the indicated resource blocks, it does not require additional information about the scheduled UE, such as the cell radio network temporary identifier (C-RNTI) and the measurement request may be as dynamic as the scheduling of the uplink grants.

If the measurement request to the small cell node is to measure the sounding reference signal (SRS) of a given UE then the request must include the C-RNTI of the UE and the location of the SRS.

The decision to activate a new node may be made based on the estimated number of UEs that may attach to the new node if it were activated. In one embodiment, a UE may be assumed to attach to the new node if the average measurement of the SRS or some uplink signaling channel sent to the macro eNB is greater than a threshold.

In order to avoid frequently activating and deactivating the node when a channel condition of a UE fluctuates, a first derivative of the measurement can also be calculated. If the first derivative is greater than zero, the UE is more likely to remain attached to the new node. A positive value for the derivative indicates that the UE is moving towards the new node, while a negative derivative indicates that the UE is moving away from the new node.

The decision to activate a new node k may be determined by evaluating equations 14 and 15 below.

$$\overline{m_i} = \sum_{n=1}^{N} w_{i,n} m_{i,n} \tag{14}$$

$$\Omega_k = \{i \mid (\overline{m_i} > T_2) \lor [(T_1 < \overline{m_i} < T_2) \land (m_{i,n} - m_{i,n-1} > 0))]\} \tag{15}$$

In equation 14 above, the variable $\overline{m_i}$ is the weighted average uplink signal strength of UE i that is calculated by node k. Further, N is the length of the window for averaging the measurements and $\Omega_k$ is the set of all UEs that are likely to attach to the new node. The conditions in the definition of the set $\Omega_k$ are the UE association conditions.

Two thresholds are defined for the weighted average. The threshold $T_2$ is used to count the UEs near the centre of the new cell. The threshold $T_1$ is used to count the cell edge UEs.

The derivative is only combined with the condition for the cell edge UEs since those UEs are more likely to affect the number of UEs attached to the new cell if the derivative is negative.

The new node is activated if equation 16 is satisfied.

$$|\Omega_k| > N_a \tag{16}$$

In equation 16, $|\Omega_k|$ represents the number of elements in the set $\Omega_k$. The parameter $N_a$ is the cell activation threshold.

Once a small cell is activated, a sensing feedback channel can be used to collect sensing information for the new node that is entering the network in order to adjust the output power of the small cell. When the small cell is first turned on or when it comes out of the standby state, the node may determine the best component carrier and transmit power for operation.

Further, using sensing information from a large number of UEs may improve the reliability of the sensing decision. For example, an HeNB may not be able to detect a hidden node operating nearby due to shadowing, whereas a UE that is in the coverage area of both nodes will be able to detect the interference. This is shown below with regard to FIG. 5.

Figure 5:
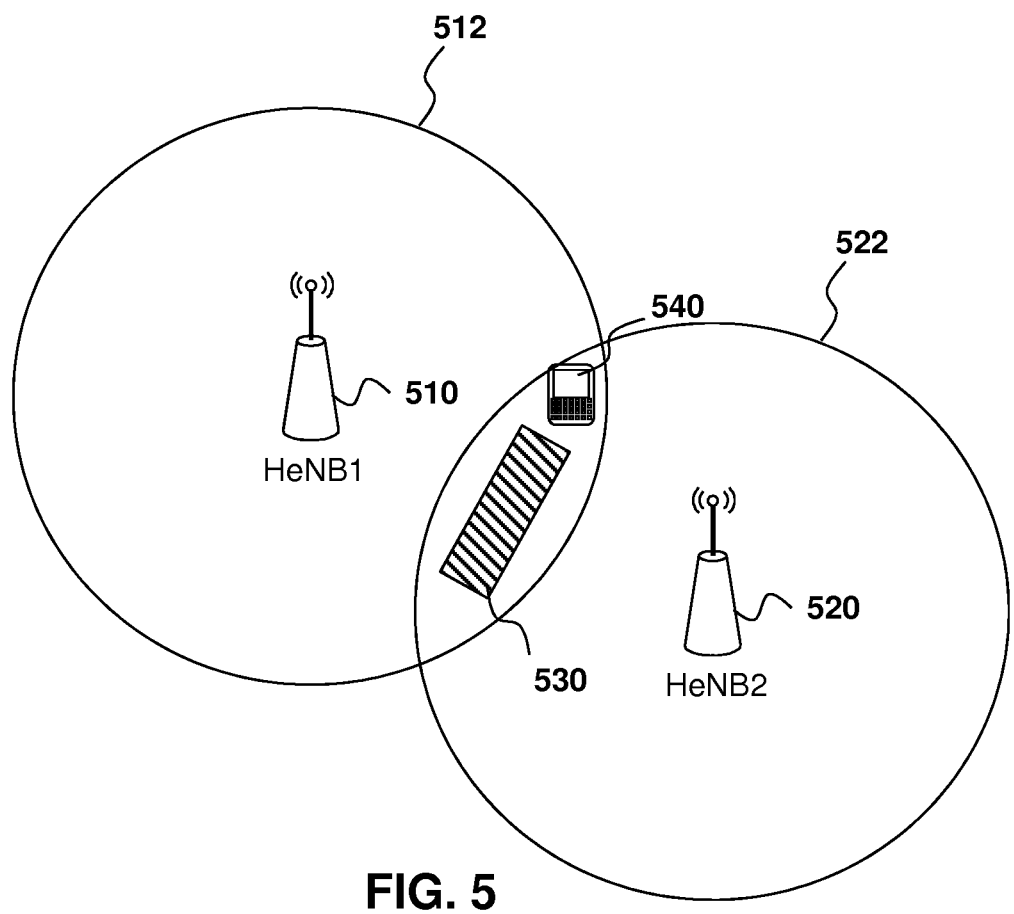
FIG. 5 is a block diagram showing two small cells which may interfere with each other but are hidden from each other.

As seen in FIG. 5, a first HeNB 510 has a first coverage area 512. A second HeNB 520 has a coverage area 522. An obstacle, such as a building, designated by reference numeral 530, shadows HeNB 510 from HeNB 520. However, a UE 540, which is in the coverage area of both HeNB 510 and HeNB 520 can detect the interference that one HeNB is causing for the other.

FIG. 5 also illustrates that both small cell nodes can transmit at a higher power if there are no UEs in the overlapping region. When one or more UEs move into the overlapping region, additional sensing feedback may trigger a configuration adjustment to accommodate the new UE distribution.

Figure 6:
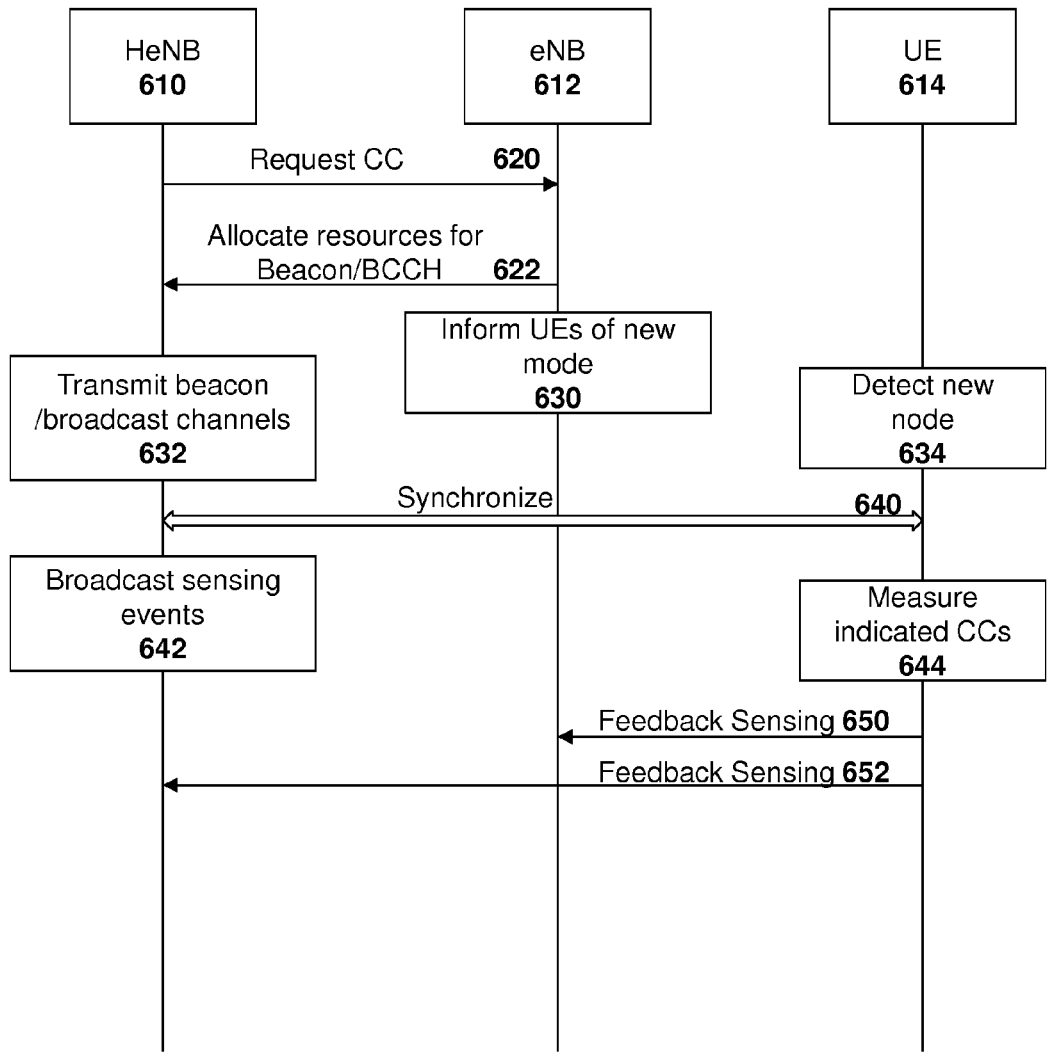
FIG. 6 is a data flow diagram showing a process for obtaining a new component carrier and operating parameters.

Reference is now made to FIG. 6. As illustrated in FIG. 6, steps are provided for obtaining a new component carrier and operating parameters by collecting sensing information from nearby UEs.

As seen in FIG. 6, HeNB communicates with a macro eNB 612 and further a UE 614 may communicate with both.

When HeNB 610 comes out of a standby state, it may send a request for a component carrier to macro eNB 612, shown by request 620. The request may include the location of the HeNB and further may include operating parameters for the HeNB.

Once eNB 612 receives the request, it may allocate resource blocks (RBs) on either a downlink or uplink component carrier used by the macro eNB 612. The allocation may use, for example, an uplink grant message. The RBs are used by the HeNB to transmit a beacon that can be detected by nearby UEs. Alternatively the HeNB may transmit a synchronization channel and/or a broadcast channel. The allocation of the resources for the beacon or broadcast channels is shown by message 622 in the embodiment of FIG. 6.

Using the location information of the requesting HeNB, the macro eNB 612 informs UEs that are nearby to detect the new node. This can be through a broadcast message, a multicast message that is beamformed towards the location of the requesting HeNB or a unicast message to each UE individually, for example. The message may include an event trigger. For example, the event trigger may be that the UEs are within a specified distance of the requesting node. If the UE satisfies the event trigger, the UE may obtain a downlink synchronization with the node using the beacon and decodes the broadcast/multicast messages from the new HeNB 610 containing the sensing events.

The above is shown with block 630 for the provision of the information to the UEs from eNB 612. Further, the transmission of the beacon or broadcast channels is shown by block 632 and the detection of the new node at UE 614 is shown by block 634.

Once the UE 614 has detected the new nodes at block 634, the UE may then synchronize with HeNB 610, as shown by block 640 in the embodiment of FIG. 6.

The sensing events are broadcast as shown by block 642 from HeNB 610. The sensing event trigger may include coordinates for the reference location, component frequency and bandwidth to measure among other factors. It may also include the configuration of the uplink sensing feedback channel (SFCH), which may include time and frequency resources to be used for the feedback and the type of feedback required. For example, the type of feedback may include analogue feedback with phase or amplitude modulation as descried below.

The sensing feedback may also include details on how sensing measurements are weighted. The sensing event trigger may be provided using RRC signaling, for example.

Four cases for configuring the measurement requests and collecting the feedback are provided below. These are:
 a. The UE obtains the configuration information from the macro eNB and reports the measurements to the macro
 b. The UE obtains the configuration information from the macro and reports the information to the small cell node,
 c. The UE obtains the configuration information from the small cell node and reports the information to the macro and
 d. The UE obtains the configuration from the small cell node and reports the information to the small cell node.

When the UE 614 needs to communicate with both macro and small cells, dual connectivity to macro and small cells may be utilized.

The configuration of the measurement requests can be either sent by the macro eNB or the small cell node.

Once the measurement request is configured, the UE may then measure the indicated component carriers, as shown by block 644 in the example of FIG. 6. The measurements may include the total received power and/or the received signal power from each individual neighbor nodes. The received power measurements could be received signal strength indicator (RSSI), reference symbol received power (RSRP) or reference symbol receive quality (RSRQ).

If a sensing or measurement event is triggered, the UE can send the sensing information or measurement report to the new small cell node 610 if it is synchronized with the new node on the uplink. Alternatively, the UE can send the sensing information back to the macro eNB 610. Feedback sensing is shown by messages 650 and 652 in the embodiment of FIG. 6.

In the case where the broadcast of the sensing or measurement events and the feedback of the sensing information are to or from the small cell node, the downlink and uplink communication between the small cell node and the UEs can operate in either the frequency division duplex (FDD) or time division duplex (TDD) modes on the uplink or downlink resource blocks assigned to the small cell node. The downlink resource blocks are used for broadcasting the sensing or measurement events and transmitting a beacon or synchronization channel. The uplink resource blocks are used by the UEs for sending the random access channel to obtain uplink synchronization and for sending the uplink sensing feedback. Once the new node begins to transmit the broadcast channels, normal initial access procedures may be performed by the UEs. The steps for initial access include cell search and selection, initial synchronization and random access.

When performing the embodiment of FIG. 6, the UE may simultaneously communicate with the macro eNB and the new node. In this case the new node is itself synchronized with the macro eNB and has established a communication link with the macro eNB and therefore some of the initial access steps may be simplified. For example, the macro eNB may provide additional information about the new cell node such as the cell identifier. The radio frame boundary may be assumed to be the same as the macro eNB and the uplink random access channel (RACH) can be similar to the uplink RACH normally sent to the macro eNB. The random access approach to the HeNB 610 may be either contention based or contention free. If contention free, the random access preamble may be assigned to the UE by the macro eNB.

The above may be utilized, for example, where the coverage area of the HeNB 610 is small and the UEs are close to the HeNB. The resources used for the embodiments described above may be used with low transmit power and can therefore be reused by other nodes that are far enough away from HeNB 610.

In further embodiments, the macro eNB may broadcast the sensing events. UEs that satisfy event conditions can send sensing information to the macro eNB 612. Once the macro eNB 612 collects the sensing statistics from the UEs it can then determine the optimum transmit power of new node 612.

SON for Small Cell Deployment in LTE-A: Small Cell Nodes Share Spectrum

In accordance with one embodiment of the present disclosure, sharing spectrum among a large number of small cell nodes within a coverage area of a macro eNB is provided. In this case, small cells can communicate with the macro eNB on a separate carrier to obtain spectrum usage within the macro coverage area. The present embodiment describes when and how to activate a new small cell node in order to improve spectrum utilization. The new small cell node can determine the optimum maximum transmit power to use on a number of carriers in order to select the best carrier for operation. Cooperative sensing may be used to determine the optimum component carrier and operating parameters. The optimization method may be centralized, semi-distributed or fully distributed.

In particular, in a typical LTE-A deployment scenario, there may be a large number of small cell nodes located within the coverage area of a macro eNB. In this case, interference mitigation techniques between small cell nodes may be necessary to avoid interference issues. The interference between neighboring small cell nodes may be controlled by allocating an appropriate component carrier and transmit power to the small cell nodes. Such scenario is analogous to a coexistence problem between secondary system and a cognitive radio system, where the secondary systems are small cell nodes.

In accordance with the present embodiment, when a new node is added or removed, or if the transmit power of the node is updated, neighboring nodes may also be impacted. In order to effectively manage interference, a dynamic approach to configuring new nodes and reconfiguring existing nodes is provided.

The reconfiguration of operating parameters of an existing node may include changing the allocated component carrier or may involve changing the transmit power of the node. The transmit power decision may be made using one of the following techniques.

In a first technique, a distributed approach may be used, where each small cell node makes its own decision. In a second technique, a semi-distributed approach may be used, where some of the decisions are made by the small cell node and other decisions are made by the macro eNB. In a third approach, a centralized approach may be used, where all the decisions are made by the macro eNB. Each is discussed below.

Distributed Case

In the distributed case, the power of cell k at iteration time n, $P^{(k)}(n)$ may be updated by adding the minimum power adjustment calculated for the neighboring set of cell k. The power adjustment for each neighbor cell is determined by the difference between the measured cell edge SINR and the target SINR. The updated transmit power of node k may be represented in accordance with equation 17.

$$P^{(k)}(n+1)=P^{(k)}(n)+\min\{SINR_j-SINR_{target}\}, \quad (17)$$

where $j \neq k$ and $j \in N_k$

In equation 17 above $P^{(k)}(n)$ is the transmit power of node k at time n. $SINR_j$ is the weighted average SINR obtained from the sensing or measurement report from a cell edge UE or cell edge UEs in cell j. $N_k$ is the neighbor set of cell k. Several iterations of equation 17 may be needed to converge to an optimal power setting for each cell. The equation 17 assumes that all nodes meet SINR targets before the adding of any new node.

The neighbor set of cell k may be determined by the macro eNB based on a geo-location of the node that is reported to the macro on the new nodes request for a component carrier. A neighbor may be defined as a node within a specified distance to the requesting node, for example.

Since not all sensing UEs are at a cell edge, the weight that is applied by each UE can take into account the location of a UE. UEs that are close to the serving cell and further away from the new cell may have a smaller weight since they are less affected by the transmission of the new cell. Similarly, UEs that are closer to the new cell and further from the serving cell will be more affected by the interference and may be given a greater weight. In this case, the weight applied by the UEs can be a function of a path loss to the serving cell.

However, in other embodiment, the weight applied by the UEs may be equal.

Figure 7:
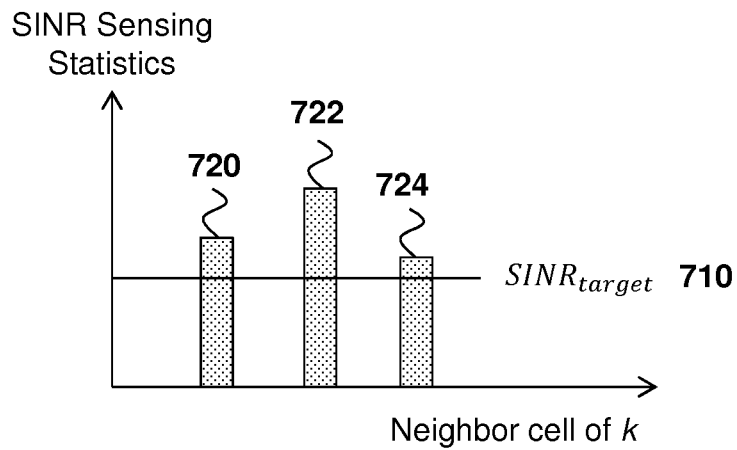
FIG. 7 is a bar plot showing SINR sensing statistics for a neighbor cell of cell k.

Reference is now made to FIG. 7. In FIG. 7, a plot is provided showing the SINR sensing statistics for neighbor cell of k. The plot of FIG. 7 provides a target SINR value 710.

Further, as seen in the embodiment of the FIG. 7, the SINR from neighboring cells is shown with bars 720, 722, and 724. The minimum excess coverage over the target SINR is provided by the neighbor cell shown with bar 724.

Figure 8:
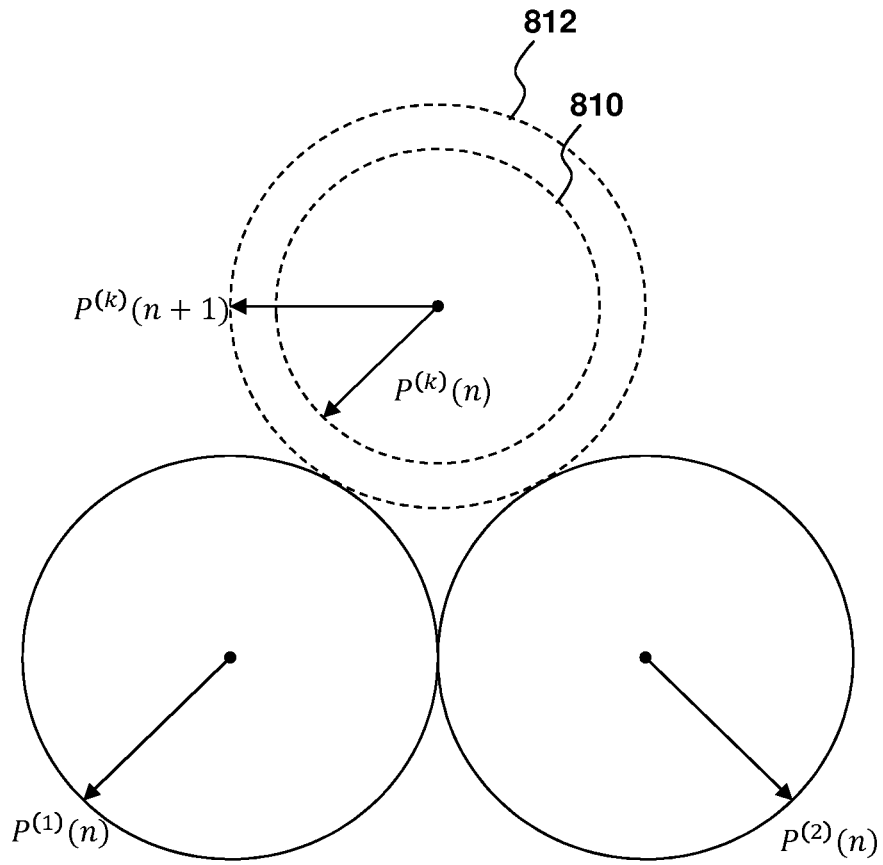
FIG. 8 is a plot showing the transmission power of various small cells.

Referring to FIG. 8 the figure shows the transmit power of the new node at time interval n and power at time interval n+1, shown by reference numerals 810 and 812, based on the iterations of equation 17 above. The transmit power shown by reference numeral 812 does not intersect with the other small cells but provides an optimized power for transmission.

The use of equation 17 above depends on receiving SINR measurements. In order to collect sensing information, a beacon may be transmitted using the maximum transmit power for the node. If the resources for the beacon are allocated by the macro eNB, neighboring nodes may be informed of the beacon so that they can avoid interfering with the beacon. By using the maximum transmit power, more UEs may participate in providing sensing feedback.

In the distributed case, the small cell node collects sensing statistics. From the sensing statistics, small cell node k can calculate the required transmit power $P^{(k)}$ that would ensure the minimum SINR of UEs in the neighboring nodes is achieved. The optimization problem may be provided in accordance with equation 18 below.

$$\text{Maximize} P^{(k)} \quad (18)$$

Equation 18 is subject to equation 19.

$$SINR_{i,j} > SINR_{target}, \forall j \in N_k, i \in j \quad (19)$$

Thus, the goal in accordance with equation 18 is to maximize the $P^{(k)}$ subject to the fact that the $SINR_{i,j}$ is greater than the target SINR and $SINR_{i,j}$ is the SINR of UE i in neighboring cell j.

Semi-Distributed Case

In a semi-distributed case, after collecting the sensing statistics or measurement reports the small cell node or the macro cell node may calculate the best transmit power for the small cell node and for each cell in the small cell node neighbor set. The sensing statistics may include the received power of the new node and each of the neighbor nodes. From the sensing statistics, a probability distribution function (pdf) of the SINR may be obtained for each of the neighboring cells. The probability distribution function can be used to determine the number of UEs that will experience an outage and not meet the target SINR. By adjusting the transmit power of the new cell and the neighboring cells, the number or UEs in an outage situation may be minimized.

If the new node determines that one or more of the neighboring nodes should reduce its transmit power, the new node may send the recommended transmit power updates to the macro eNB and the macro eNB can make the transmit power update decisions.

Thus, in a semi-distributed case, the optimization problem may be provided as shown below in equation 20.

$$\Theta = \{i \mid SINR_{i,j} < SINR_{target}, \forall\ j = k, j \in N_k\} \quad (20)$$

Minimize $|\Theta|$

In accordance with equation 20, a definition for all sets of UEs in outage is defined as the set where the SINR of the UE is less than the target and the goal is to minimize the number of UEs in that set. Equation 20 above the subject to equation 21:

$$P^{(j)} < P_{max} \forall j \in N_k \quad (21)$$

Figure 9:
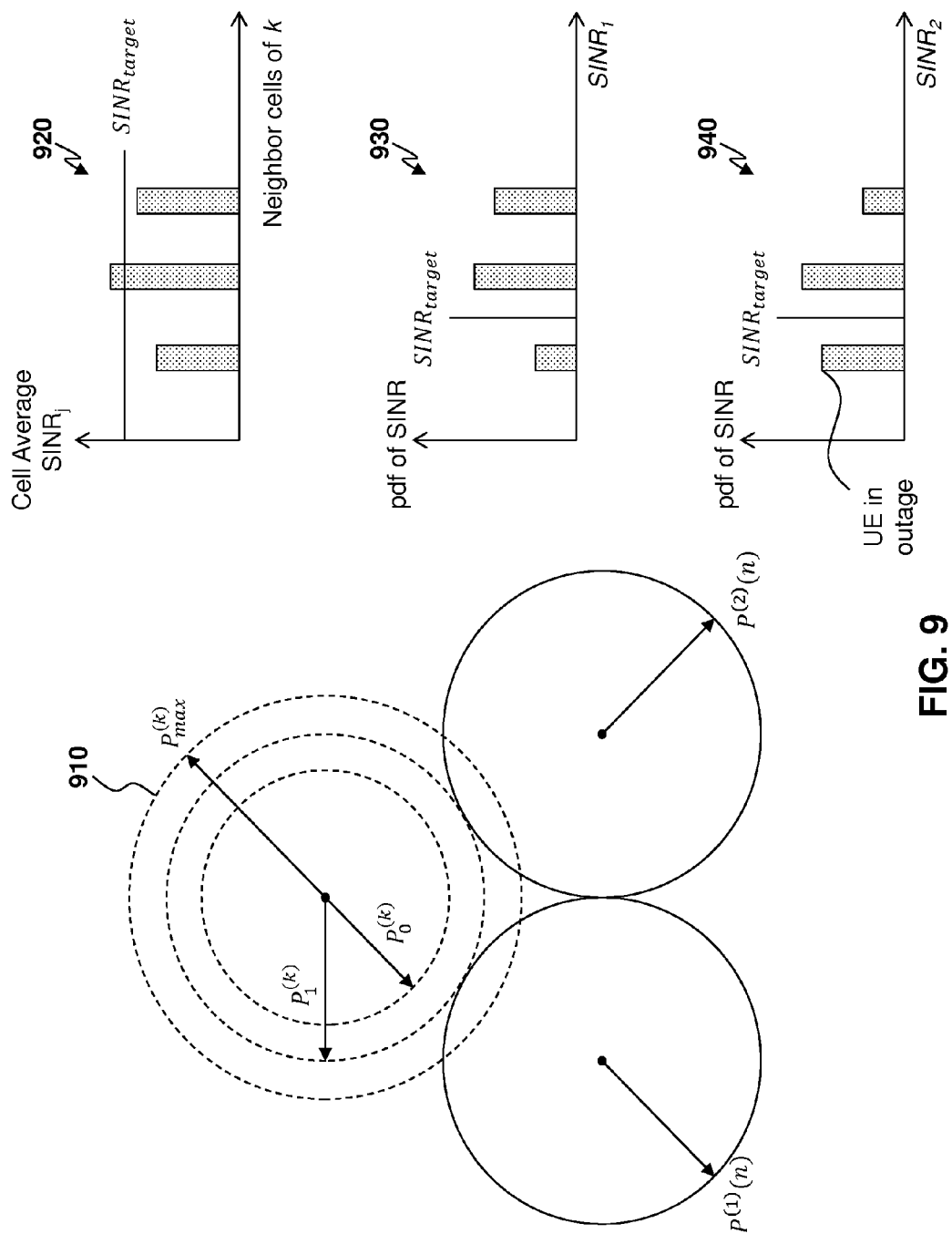
FIG. 9 is a block diagram showing the sending of a sensing beacon for obtaining sensing statistics.

Thus, the power of cell j is less than a maximum power and j is a neighboring node. Implementation of equations 20 and 21 are illustrated in the example of FIG. 9, which shows various power levels for cell k shown by reference 910. Further, FIG. 9 shows bar graphs 920, 930 and 940, illustrating that a first UE and a third UE are in outage.

Figure 10:
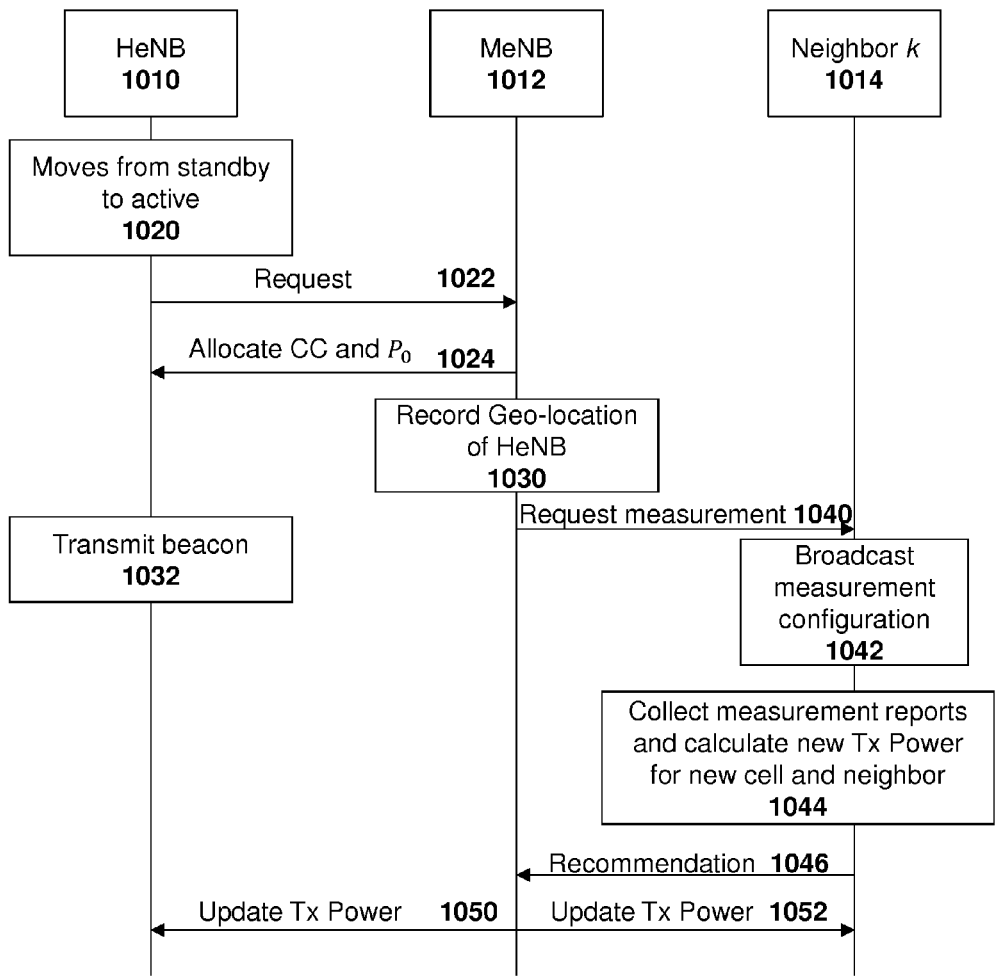
FIG. 10 is a data flow diagram showing a semi-distributed procedure for configuring a new node.

Based on the above, the procedure for configuring a new node and reconfiguring neighboring nodes for a semi-distributed case is illustrated in the example procedure shown with regard to FIG. 10.

In particular, a small cell such as home eNB 1010 communicates with a macro eNB 1012 and further macro eNB 1012 communicates with neighboring cells 1014.

When HeNB 1010 moves from a standby mode to an active mode, as shown by block 1020, it may send a request for component carrier to macro eNB 1012, as shown by request 1022.

The macro eNB may then allocate the component carrier and initial power level and report it back to the HeNB 1010, shown by message 1024.

The macro eNB 1012 may then record the geo-location of the HeNB, as shown by block 1030, and request that neighboring cells 1014 of HeNB 1010 measure the SINR. The request for measurements is shown with message 1040.

Based on the receipt of message of 1040, a neighboring cell 1014 may broadcast a measurement configuration message to its UEs, shown by block 1042 and may then collect the measurement reports and calculate the new transmit power for the new cell and the neighbors according to block 1044.

Based on the calculated transmit power found at block 1044, the neighboring cell 1014 may send a recommendation 1046 back to macro eNB 1012. Macro eNB 1012 may then consider the recommendations from one or more neighboring cells and send an updated transmit power to one or both of HeNB 1010 and neighboring cell 1014, shown by messages 1050 and 1052.

Figure 11:
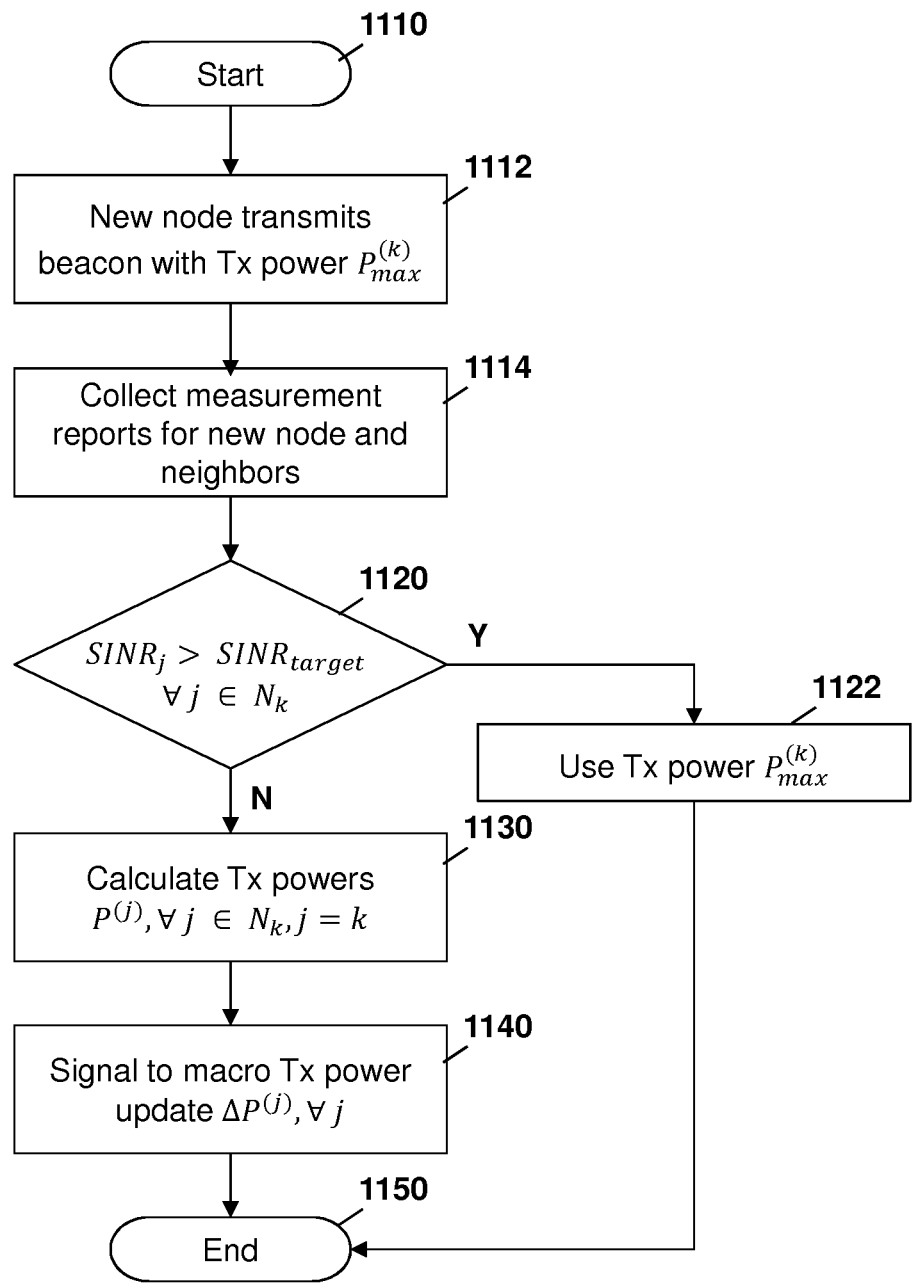
FIG. 11 is a process diagram illustrating the configuring of a new small cell and the reconfiguring of existing nodes.

The new node may then be reconfigured. Reference is now made to FIG. 11, which shows a process diagram for the reconfiguration process when a new node is activated. In particular, the process starts at block 1110 and proceeds to block 1112 in which the new node transmits its beacon with a maximum transmit power. The macro eNB may then collect measurement reports as shown at block 1114.

A check is then made at block 1120 to determine if the SINR for the cell is greater than the target SINR. If yes, then the maximum transmit power may be utilized, as shown by block 1122.

Conversely, if the SINR of the cell is less than the target SINR, then the process proceeds from block 1120 to block 1130, in which a transmit power is calculated for the cell. The process then proceeds to block 1140 in which a delta of the calculated transmit power is signaled to the macro eNB.

From block 1122 or block 1140, the process proceeds to block 1150 and ends.

Centralized Case

In a centralized case, sensing statistics are collected by the macro eNB. The statistics or measurements collected may include, but are not limited to, the received power from each node's beacon transmission and may include the noise plus the out-of-neighboring-cell-set interference power in a short out-of-set interference power by each sensing UE. With this information, the macro eNB can calculate the SINR for each sensing or measuring UE with respect to each transmission node and redistribute transmit power of each transmission node to achieve a system wide optimization goal.

The power allocation to the new node and redistribution of the transmit powers to the existing nodes is determined by the macro eNB. For example, if a new cell k is activated, the results of the sensing statistics can be categorized in accordance with equations 22 and 23 below.

$$SINR_j > SINR_{target}, \forall j \in N_k \quad (22)$$

$$SINR_j < SINR_{target}, j \in N_k \quad (23)$$

If the results are in accordance with equation 22, the new node can transmit with the transmit power equal to the power of the sensing beacon without impacting its neighboring cells.

Conversely, if the SINR matches equation 23, at least one node is negatively impacted and some power adjustments may be needed. A new cell may have three options in order to deal with this scenario.

A first option is to transmit at a lower power to avoid interfering with the neighboring cells. A second option is to adjust the power of the new node and the neighboring nodes. A third option is to allow the excess interference if the UEs are capable of interference cancellation techniques or if other co-channel interference mitigation factors are used. This third option is also possible when UEs in the interference zone are also connected with the macro eNB.

The macro eNB can make the decision based on a utility function that may depend on system capacity or power savings or may be a compromise between these two factors.

In one embodiment, the optimum transmit power may be determined through maximizing the sum capacity of all of the nodes in the neighboring set $N_k$, which can be written using Shannon's equation as shown in equation 24 below.

$$\text{Maximize } C = \sum_{k=1}^{N_k} \log_2(1 + \widetilde{SINR}_k) \quad (24)$$

where $$\widetilde{SINR}_k = \sum_{i=1}^{N_S(k)} w_{ik} SINR_{i,k}$$

$$SINR_{i,k} = \begin{cases} \dfrac{S_{i,k}}{\sum_{j \neq k} S_{i,j} + I + N}, & \text{if } SINR_{i,k} > SINR_{target} \\ 0, & \text{otherwise} \end{cases}$$

$$S_{i,k} = a_{ik} P^{(k)}$$

In equation 24 above, the term $N_S(k)$ represents the number of sensing UEs in a cell k. $\widetilde{SINR}_k$ represents the weighted average of the measured SINR of all sensing UEs in cell k. $S_{i,k}$ represents the received power for the sensing UE i in cell k and $a_{ik}$ represents the channel gain for UE i in cell k.

In the above capacity equation, only the UEs that satisfy the inequality of equation 25 below are included.

$$SINR_{i,j} \geq SINR_{target} \quad (25)$$

In the above, the UEs can report the received power from the new cell, $S_{i,k}$, the received power from neighboring cells j, $S_{i,j}$, and the remaining interference plus noise, I+N. With this information, each neighbor cell j can determine the optimum transmit power for the new cell.

In order to solve equation 24 above for an optimum transmit power level, a number of optimization techniques may be used. For example, a gradient descent approach may be used where the gradient of the capacity function is given by equation 26.

$$\nabla C(\vec{P}(n)) = \left( \frac{\partial C(P^{(k)}(n))}{\partial P^{(k)}}, \frac{\partial C(P^{(1)}(n))}{\partial P^{(1)}}, \ldots, \frac{\partial C(P^{(n_k)}(n))}{\partial P^{(n_k)}} \right) \quad (26)$$

The partial derivatives of equation 26 may be used in accordance with equation 27:

$$\frac{\partial C(P^{(j)}(n))}{\partial P^{(j)}} \cong \frac{\Delta C(P^{(j)}(n))}{\Delta P^{(j)}} \quad (27)$$

In equation 27, the term on the right approaches the partial derivative as $\Delta P^{(j)}$ goes to zero.

The transmit power vector is updated using equation 28.

$$\vec{P}(n+1) = \vec{P}(n) + \delta_n \nabla C(\vec{P}(n)) \quad (28)$$

In equation 28, $\delta_n$ is the step size and can be determined using the line search method. In the line search method, $\delta_n$ is chosen to minimize $f(\delta) = C(P^{(k)} + \delta \nabla C(P^{(k)})), \delta_n > 0$ Alternatively, the optimum transmit power of a new node k can be determined by maximizing a capacity function that is defined as the number of UEs that are served by the small cell nodes. This function can be written in accordance with equation 29.

$$C = N_u^{(k)}(\vec{P}) + \sum_{\substack{j \neq k \\ j \in N_k}} N_u^{(j)}(\vec{P}) \quad (29)$$

In equation 29 above, $N_u^{(k)}(\vec{P})$ is a function that represents the number of UEs attached to a node k given the transmit power vector $\vec{P} = (P^{(k)}, P^{(1)}, \ldots, P^{(n_k)})$, which consists of the transmit powers for cell k and the neighbor cells of cell k.

The optimization problem that maximizes the total number of UEs that are served by the small cell cluster may be expressed in accordance with equation 30 below.

$$\text{Maximize } C = N_u^{(k)}(\vec{P}) + \sum_{\substack{j \neq k \\ j \in N_k}} N_u^{(j)}(\vec{P}) \quad (30)$$

$$\text{subject to } P^{(j)} \leq P_{max}^{(j)}, \forall j$$

A UE is assumed to be connected to a small cell node if it meets the target SINR. Such meeting is given by the inequality $SINR_{i,j} \geq SINR_{target}$ where $SINR_{i,j}$ represents the SINR for cell j measured by UE i.

The transmit power of cell k is only updated if a change in the capacity equation is positive.

In order to account for the trade-off between system capacity and power consumption for small cell nodes, the function of equation 31 below may be used.

$$\text{Maximize } F = \left[ \frac{C(n+1) - C(n)}{C(n)} \right] - \beta \left[ \frac{P^{(k)}(n+1) - P^{(k)}(n)}{P^{(k)}(n)} \right] \quad (31)$$

In equation 31, C(n) represents the capacity at time n.

Further, in the function of equation 31, a cost is applied to the capacity gain if there is an increase in transmission power. The parameter β is used to control the trade-off between capacity and power consumption. If β equals zero then there is no cost applied to account for an increase in transmission power. In this case, the equation reduces to maximizing the capacity equation.

To account for changing geographic distribution of the UEs within the macro coverage area, the active small cell can periodically update the transmit power using sensing statistics. The updated power may be written in accordance with equation 32 below.

$$P^{(k)}(n+1) = \min\left\{ \left[ P^{(k)}(n) + \min_{\substack{j \neq k \\ j \in N_k}} \{SINR_j - SINR_{target}\} \right], P_{max}^{(k)} \right\} \quad (32)$$

Using equation 32, node k can either increase or decrease the transmit power depending on the conditions in the neighboring cells. If some UEs in a neighboring cell are not meeting the target SINR then the node may decrease the transmit power. Otherwise, if all the neighboring nodes are exceeding the target SINR then the node may increase the transmit power.

If there are multiple component carriers available for the small cell nodes then the macro eNB may allocate resources for the sensing beacon on multiple carriers. The macro eNB can decide which carrier to allocate based on the allowed transmit power on the carrier and the total number of UEs that can be served. For example, if the allocated transmit power on a given carrier is too small then the carrier may not be able to serve any UEs or only a limited number of UEs.

With the above approaches, multiple component carriers may be allocated to the new small cell node. Once the carriers are allocated, the node may periodically re-calculate the optimum operating parameters. The node may also monitor the number of UEs that are served on each carrier. If there are no UEs served on a given carrier after a specified time then the carrier is de-allocated. When the component carrier is de-allocated, the node informs the eNB in order to allow reporting to the spectrum management or radio resource management entity in the network.

In one embodiment, in order to minimize interference to the reference symbols of neighboring nodes, the sensing beacon may use orthogonal resources. This may be achieved by either using a different time, frequency or code.

Uplink Sensing Feedback Channel Design for LTE-A

In any of the above embodiments, uplink sensing feedback is required. In accordance with the present disclosure, one possibility for providing uplink sensing feedback is to provide an uplink sensing feedback channel design that can be used to support the embodiments. However, the present disclosure is not limited to such uplink sensing feedback channel and the uplink sensing feedback provided herein is only meant as an example.

In accordance with one embodiment of the present disclosure, a sensing feedback channel is provided that is an analog feedback channel where the sensing information is either a phase modulated or amplitude modulated. The low overhead uplink sensing feedback channel (SFCH) may be designed for LTE-A and beyond systems.

The sensing feedback channel for a UE i and a component carrier k may be defined by a pair of resource elements ($RE_m$, $RE_{m+1}$), where m may be a function of a user equipment identifier (or may be dynamically or semi-statically assigned by the eNB), and the component carrier corresponding to the sensing feedback. The first resource element (RE) in the pair may be used for a UE transmitting a reference symbol to the eNB such as the primary user, which has a fixed transmit power and is known to both the transmitter and the receiver.

The second RE is used for transmitting the sensing information, scaled by the quality of the sensing measurement. Thus, the quality of the sensing measurement may be the measured SINR of the primary user that is detected on the component carrier by the UE or the distance of the sensor to the primary user transmitter.

Sensing symbols are only sent when an event is triggered. For example, a sensing event may be triggered when the UE detects the primary user on a component carrier. If the measured SINR of the primary user is used to indicate the quality of the sensing information, the SFCH for UE i and component carrier k may be defined in accordance with equation 33 below.

$$SFCH_{i,k} = (RE_m, RE_{m+1}) \quad (33)$$

In equation 33 above, the variable m may be defined, for example, as a function of the UE ID (e.g. C-RNTI for RRC Connected UEs or System Architecture Evolution (SAE) Temporary Mobile Subscriber Identity (S-TMSI) for RRC Idle UEs) and the event ID, k. Thus, m is a function as provided by $m = f(UE_i, k)$ The power ratio of the RE's may be given by equation 34.

$$\left\| \frac{RE_{m+1}}{RE_m} \right\|^2 = b_i SINR_{i,k} \quad (34)$$

In equation 34 above, $SINR_{i,k}$ is the measured SINR of the component carrier k for UE i and $b_i$ is a scaling factor for UE i. The parameter m identifies the sensing symbols and the sensing reference symbol for the given UE and is a function of the UE identifier and the event k. The transmit power of the reference symbol, $RE_m$, may be represented as $P_{RS}$. The transmit power on the sensing data symbol is then given by equation 35 below.

$$P_{SS,k} = \|RE_{m+1}\|^2 = b_i SINR_{i,k} P_{RS} \quad (35)$$

Since only the power ratio between the sensing symbol RE and the reference symbol RE is of interest in the present case, if amplitude modulation is used the UE may scale the power for both REs to ensure that the UE has enough power to send the feedback. The power ratio, which represents the sensing value, may use the inequality in accordance with equation 36 to provide the report.

$$\frac{P_{min}}{P_{max}} < \frac{P_{SS,k}}{P_{RS}} < \frac{P_{max}}{P_{min}} \quad (36)$$

In equation 36, $P_{max}$ is a maximum transmit power on a RE for a UE and $P_{min}$ is the noise floor on a RE. If the sensing value exceeds the range $$\left[ \frac{P_{min}}{P_{max}}, \frac{P_{max}}{P_{min}} \right],$$

the reporting value can be capped to a maximum or minimum value of the reporting range.

Alternatively, the SINR information may be encoded into the phase difference between the two REs. This may be expressed mathematically in accordance with equation 37 below.

$$angle(RE_{m+1}, RE_m) = b_i SINR_{i,k} \quad (37)$$

In the alternative embodiment, an advantage exists that two REs can be transmitted at the highest possible power level and thus may not be sensitive to the effect of the feedback link noise.

The resource block used by node j for the SFCH may be reused by other nodes that are sufficiently far from node j. Alternatively, the macro eNB may reuse the resources for macro UEs that are close to the eNB and far enough away from the nodes collecting the sensing information.

Figure 12:
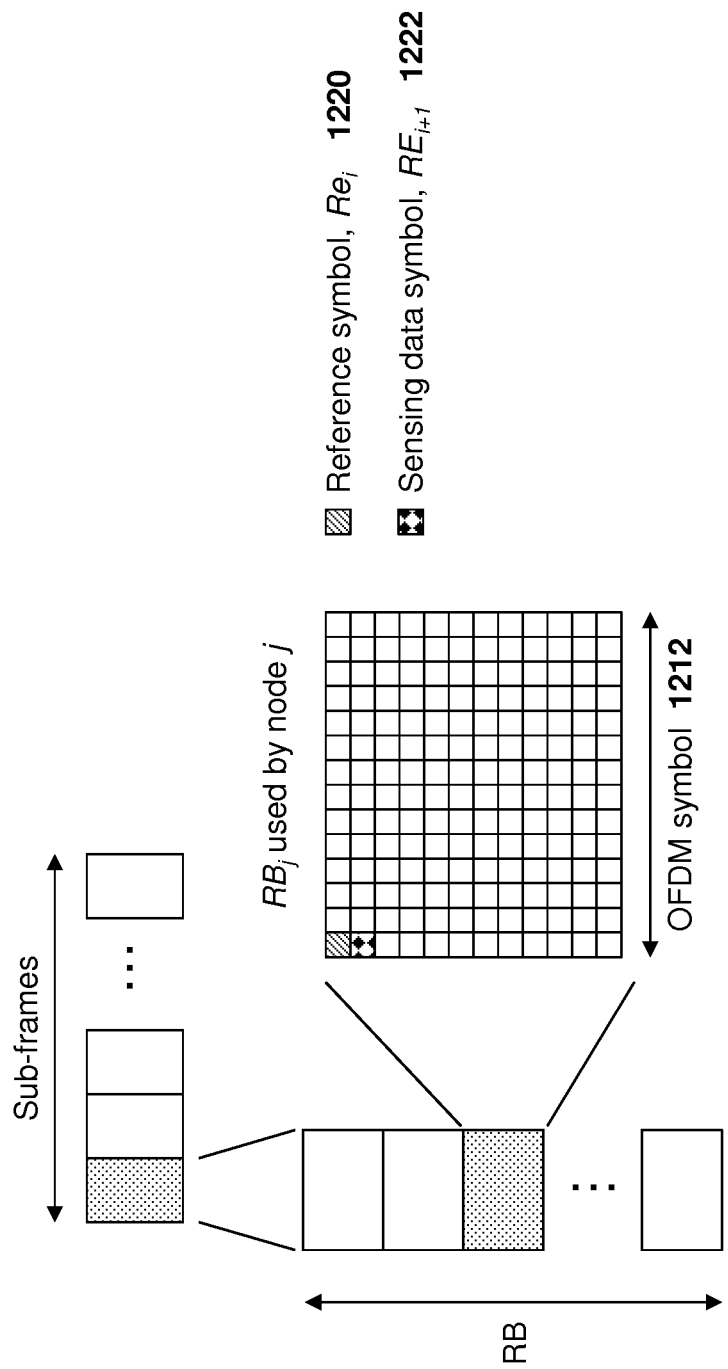
FIG. 12 is a block diagram of a channel structure for an uplink sensing feedback channel.

Reference is now made to FIG. 12, which shows a design of SFCH.

In particular, the resource block 1210 includes multiple OFDM symbols 1212 having a reference symbol 1220 and a sensing data symbol 1222. A number of UEs may be multiplexed onto the resource block 1210.

Utilizing the analog feedback channel described above, 84 SFCH channels may be configured into one physical resource block pair.

In contrast, if the information is explicitly signaled by each UE then the amount of resources required is considerably higher. Specifically, the amount of resources in the explicit signalling case depends on the number of bits used to quantize the quality information. For example, if the number of bits used for sensing quality information is quantized to 5 bits and if a channel similar to the PUCCH (DCI format 2 for CQI reporting) is used, then the maximum number of UEs that may be supported per RB pair is 6. The number of UEs that can be supported by explicit signalling is significantly lower than if using the above analog signaling scheme. Further, the reduction in the number of UEs that are able to participate also reduces the quality of the sensing decision, since the more UEs that are able to participate in the sensing decision, the better the performance of the sensing decision.

In order to determine if a component carrier k is available or occupied, the node collecting the sensing information must sum the different power ratios across all UEs that reported the event associated with CC k.

The sensing information from the different UEs for event k can be combined coherently or incoherently using the equations 38 or 39, respectively.

$$T_{SFCH,k} = \left( \frac{1}{N_s} \sum_{i=0}^{N_s-1} \frac{RE_{2i+1,k}}{RE_{2i,k}} \right)^2 \quad (38)$$

$$T_{SFCH,k} = \frac{1}{N_s} \sum_{i=0}^{N_s-1} \left( \frac{RE_{2i+1,k}}{RE_{2i,k}} \right)^2 \quad (39)$$

In the equations 38 and 39 above, $N_s$ is the number of SFCH channels configured.

If no event is triggered for a given UE, then the UE may only send the reference symbol. Alternatively, if the threshold is applied to the sensing reference symbol to determine if the SFCH was sent by the UE, then the UE does not have to send the reference symbol. If the SFCH was not sent then the SFCH REs must be removed from the statistics collection. The test statistic equation for this case can then be written in accordance with equation 40 below.

$$T_{SFCH,k} = \left(\frac{1}{|J|} \sum_{\substack{i=0 \\ i \in J}}^{N_s-1} \frac{RE_{2i+1,k}}{RE_{2i,k}}\right)^2 \text{ or } T_{SFCH,k} = \frac{1}{|J|} \sum_{\substack{i=0 \\ i \in J}}^{N_s-1} \left(\frac{RE_{2i+1,k}}{RE_{2i,k}}\right)^2 \quad (40)$$

$$J = \{i \mid \|RE_{RS,i}\| > M_{RS}\}$$

In equation 40 above, $|J|$ is the number of elements in the set J and $M_{RS}$ is the sensing reference symbol detection threshold.

The channel occupancy decision for an event k is given by equation 41 below.

$$d_k = \begin{cases} H_0 & \text{if } T_{SFCH,k} < M \\ H_1 & \text{if } T_{SFCH,k} \geq M \end{cases} \quad (41)$$

In equation 41 above, $H_0$ represents the hypothesis that the channel is free and $H_1$ represents that the channel is occupied. The parameter M is a decision threshold used to control the probability of detection and the probability of false alarm. The parameter may be determined from the probability distribution functions $p(x|H_0)$ and $p(x|H_1)$, which represents the pdf of the test statistic such as the SINR, given that the primary is not present or present respectively. Alternatively, the threshold M could be determined by experimentation. In this case, where detection of the primary receiver is defined by the amount of interference that can be tolerated, the detection threshold can be set to a minimum SINR.

Figure 13:
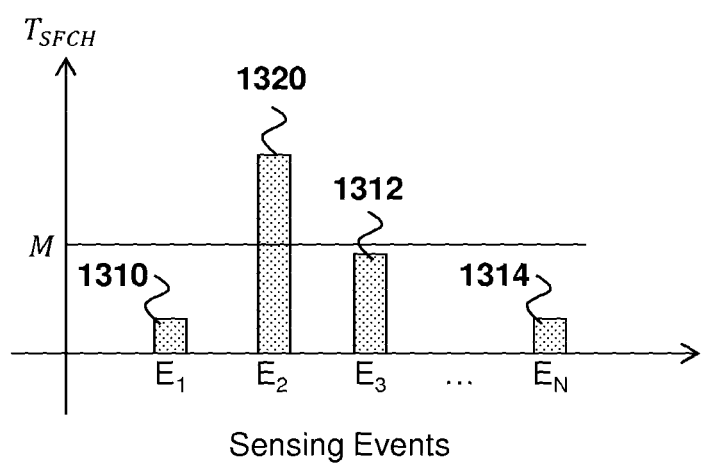
FIG. 13 is a plot showing sensing feedback results for a defined test statistic and event trigger.

Reference is now made to FIG. 13, which shows a graphical representation of the sensing feedback results for the defined test statistic and event triggers. As seen in FIG. 13, the threshold M provides a decision of which channels are occupied. The channel corresponding to E1, as shown by reference numeral 1310, E3, shown by reference numeral 1312 and En shown by reference 1314 are not occupied, while the channel corresponding to E2, as shown by reference numeral 1320, is occupied.

The SFCH channel structure can be generalized to send multiple sensing parameters by expanding the SFCH definition to $N_{RE}$ contiguous REs. This may be represented as a vector of length $N_{RE}$ in accordance with equation 42 as follows.

$$SFCH = (RE_1, RE_2, \ldots, RE_{N_{RE}}) \quad (42)$$

In equation 42 above, $RE_1$ to $RE_m$, where $1 \leq m \leq N_{RE}$, are the reference symbols and $RE_{m+1}$ to $RE_{N_{RE}}$ are the REs used to send sensing information. Alternatively, the reference symbols could be interleaved with the data REs. The sensing information is represented as a power ratio and is sent by controlling the power level on the sensing data REs. Multiple reference symbols could be sent to improve the reliability. The reliability of the sensing information can be further improved by sending multiple vectors across several RBs that are sufficiently far apart to obtain frequency diversity.

Additionally, sensing information may also include the distance to the node requesting the sensing event or the distance to the primary transmitter. In this case, it may be possible to have multiple hypotheses to specify the geographic region where the UE is located, which may then be used to determine when to activate a node that is in a standby state. For example, if a distance for a UE distance to a reference location is given by d, then the different hypotheses may be given in accordance with equation 43 below.

$$H_0: 0 < d \leq D_0$$

$$H_1: D_0 < d \leq D_1$$

$$H_n: D_{n-1} < d \leq D_n \quad (43)$$

It may be appropriate to average the sensing information over a large number of UEs and therefore idle mode UEs can also be configured as sensing nodes.

As idle mode UEs may not have the latest timing advance values, one option would be to use a longer cyclic prefix (CP) length for the uplink SFCH to ensure that the feedback from all sensing UEs falls into the CP window and the feedback is correctly received.

Alternatively, the idle mode UE may use the previously stored timing advance if the UE determines that its location did not change significantly since the last recorded measurement.

In a further alternative embodiment, when the UE is selected as a sensing node, the eNB knows the rough location of the UE, and thus the eNB can pre-determine the rough time advance value and signal the time advance value to the UE. The time advance value may be signaled to the sensing UE in the sensing configuration message or in a sensing event triggering message.

The above may be implemented by any UEs and network elements.

Figure 14:
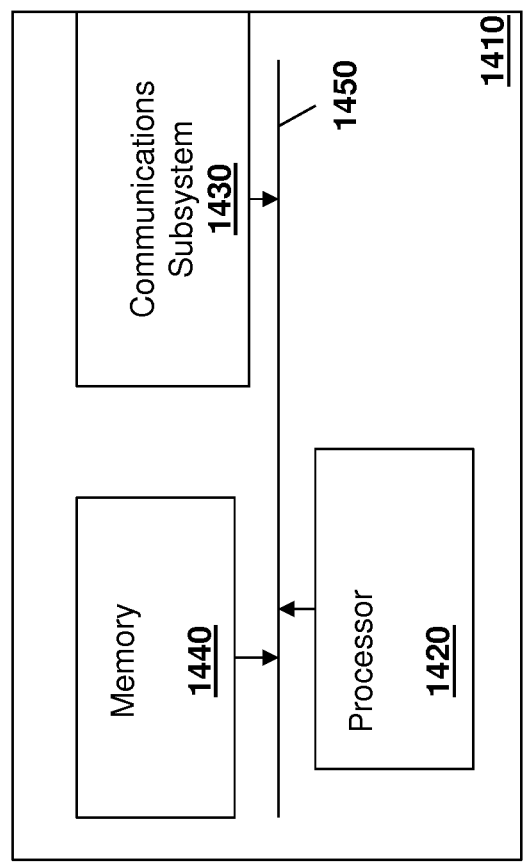
FIG. 14 is a simplified block diagram of a network element for use with the embodiments of the present disclosure.

In particular, the eNBs and network elements in the embodiments of FIGS. 1 to 13 above can be any network element, or part of any network element, including various network servers. Reference is now made to FIG. 14, which shows a generalized network element.

In FIG. 14, network element 1410 includes a processor 1420 and a communications subsystem 1430, where the processor 1420 and communications subsystem 1430 cooperate to perform the methods of the embodiments described above.

Processor 1420 is configured to execute programmable logic, which may be stored, along with data, on network element 1410, and shown in the example of FIG. 14 as memory 1440. Memory 1440 can be any tangible storage medium.

Alternatively, or in addition to memory 1440, network element 1410 may access data or programmable logic from an external storage medium, for example through communications subsystem 1430.

Communications subsystem 1430 allows network element 1410 to communicate with other network elements.

Communications between the various elements of network element 1410 may be through an internal bus 1450 in one embodiment. However, other forms of communication are possible.

Further, the above embodiments may be implemented by any UE. One exemplary device is described below with regard to FIG. 15.

UE 1500 is typically a two-way wireless communication device having voice and data communication capabilities. UE 1500 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1500 is enabled for two-way communication, it may incorporate a communication subsystem 1511, including both a receiver 1512 and a transmitter 1514, as well as associated components such as one or more antenna elements 1516 and 1518, local oscillators (LOs) 1513, and a processing module such as a digital signal processor (DSP) 1520. As will be apparent to those skilled in the field of communications, the particular design of the communication subsystem 1511 will be dependent upon the communication network in which the device is intended to operate. The radio frequency front end of communication subsystem 1511 can be any of the embodiments described above.

Network access requirements will also vary depending upon the type of network 1519. In some networks network access is associated with a subscriber or user of UE 1500. A UE may require a removable user identity module (RUIM) or a subscriber identity module (SIM) card in order to operate on a CDMA network. The SIM/RUIM interface 1544 is normally similar to a card-slot into which a SIM/RUIM card can be inserted and ejected. The SIM/RUIM card can have memory and hold many key configurations 1551, and other information 1553 such as identification, and subscriber related information.

Figure 15:
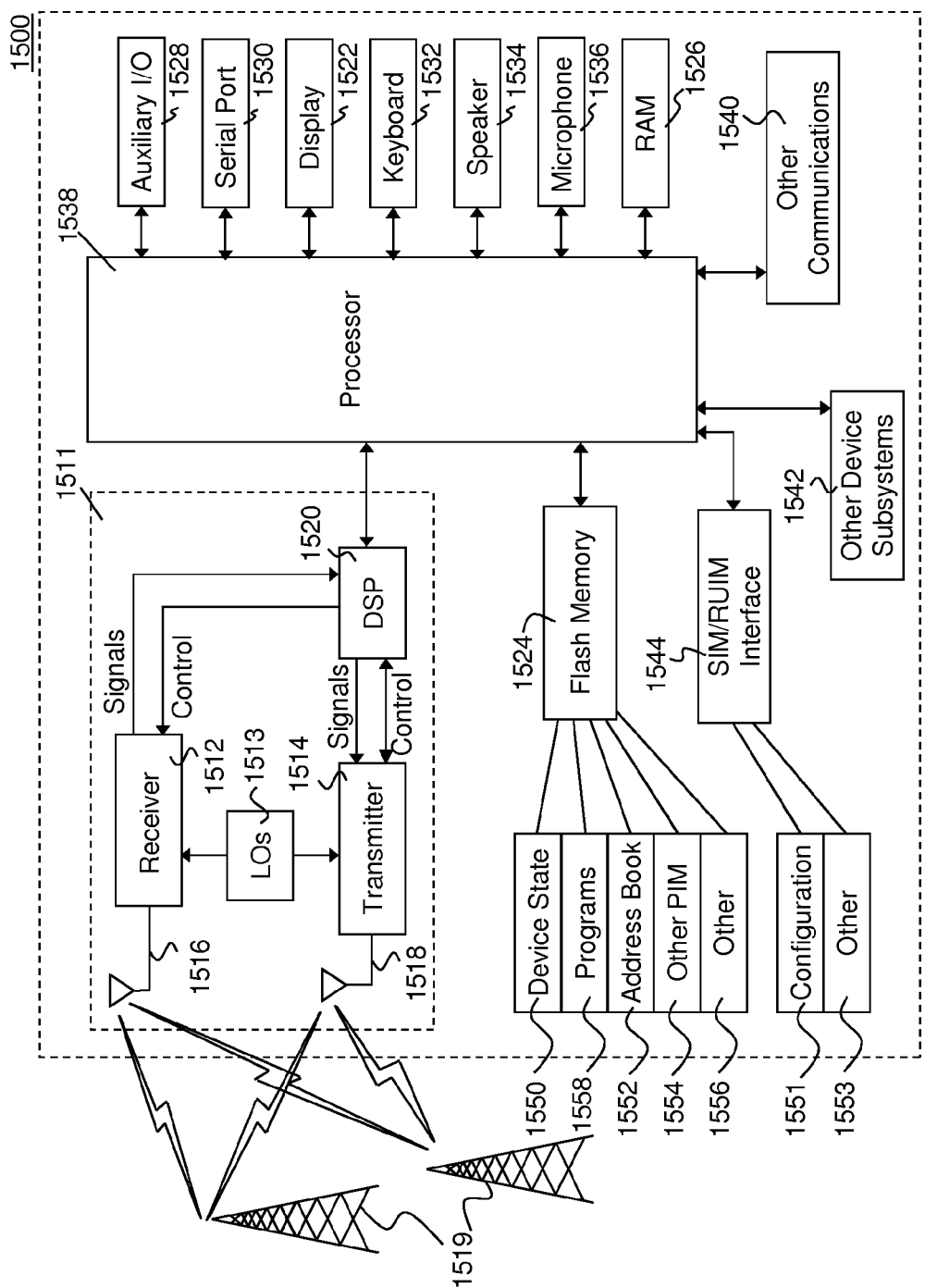
FIG. 15 is a block diagram of an example mobile device capable of being used with the embodiments of the present disclosure.

When required network registration or activation procedures have been completed, UE 1500 may send and receive communication signals over the network 1519. As illustrated in FIG. 15, network 1519 can consist of multiple base stations communicating with the UE.

Signals received by antenna 1516 through communication network 1519 are input to receiver 1512, which may perform such common receiver functions as signal amplification, frequency down conversion, filtering, channel selection and the like. A/D conversion of a received signal allows more complex communication functions such as demodulation and decoding to be performed in the DSP 1520. In a similar manner, signals to be transmitted are processed, including modulation and encoding for example, by DSP 1520 and input to transmitter 1514 for digital to analog conversion, frequency up conversion, filtering, amplification and transmission over the communication network 1519 via antenna 1518. DSP 1520 not only processes communication signals, but also provides for receiver and transmitter control. For example, the gains applied to communication signals in receiver 1512 and transmitter 1514 may be adaptively controlled through automatic gain control algorithms implemented in DSP 1520.

UE 1500 generally includes a processor 1538 which controls the overall operation of the device. Communication functions, including data and voice communications, are performed through communication subsystem 1511. Processor 1538 also interacts with further device subsystems such as the display 1522, flash memory 1524, random access memory (RAM) 1526, auxiliary input/output (I/O) subsystems 1528, serial port 1530, one or more keyboards or keypads 1532, speaker 1534, microphone 1536, other communication subsystem 1540 such as a short-range communications subsystem and any other device subsystems generally designated as 1542. Serial port 1530 could include a USB port or other port known to those in the art.

Some of the subsystems shown in FIG. 15 perform communication-related functions, whereas other subsystems may provide "resident" or on-device functions. Notably, some subsystems, such as keyboard 1532 and display 1522, for example, may be used for both communication-related functions, such as entering a text message for transmission over a communication network, and device-resident functions such as a calculator or task list.

Operating system software used by the processor 1538 may be stored in a persistent store such as flash memory 1524, which may instead be a read-only memory (ROM) or similar storage element (not shown). Those skilled in the art will appreciate that the operating system, specific device applications, or parts thereof, may be temporarily loaded into a volatile memory such as RAM 1526. Received communication signals may also be stored in RAM 1526.

As shown, flash memory 1524 can be segregated into different areas for both computer programs 1558 and program data storage 1550, 1552, 1554 and 1556. These different storage types indicate that each program can allocate a portion of flash memory 1524 for their own data storage requirements. Processor 1538, in addition to its operating system functions, may enable execution of software applications on the UE. A predetermined set of applications that control basic operations, including at least data and voice communication applications for example, will normally be installed on UE 1500 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 1519. Further applications may also be loaded onto the UE 1500 through the network 1519, an auxiliary I/O subsystem 1528, serial port 1530, short-range communications subsystem 1540 or any other suitable subsystem 1542, and installed by a user in the RAM 1526 or a non-volatile store (not shown) for execution by the processor 1538. Such flexibility in application installation increases the functionality of the device and may provide enhanced on-device functions, communication-related functions, or both. For example, secure communication applications may enable electronic commerce functions and other such financial transactions to be performed using the UE 1500.

In a data communication mode, a received signal such as a text message or web page download will be processed by the communication subsystem 1511 and input to the processor 1538, which may further process the received signal for output to the display 1522, or alternatively to an auxiliary I/O device 1528.

A user of UE 1500 may also compose data items such as email messages for example, using the keyboard 1532, which may be a complete alphanumeric keyboard or telephone-type keypad, among others, in conjunction with the display 1522 and possibly an auxiliary I/O device 1528. Such composed items may then be transmitted over a communication network through the communication subsystem 1511.

For voice communications, overall operation of UE 1500 is similar, except that received signals would typically be output to a speaker 1534 and signals for transmission would be generated by a microphone 1536. Alternative voice or audio I/O subsystems, such as a voice message recording subsystem, may also be implemented on UE 1500. Although voice or audio signal output is generally accomplished primarily through the speaker 1534, display 1522 may also be used to provide an indication of the identity of a calling party, the duration of a voice call, or other voice call related information for example.

Serial port 1530 in FIG. 15 would normally be implemented in a personal digital assistant (PDA)-type UE for which synchronization with a user's desktop computer (not shown) may be desirable, but is an optional device component. Such a port 1530 would enable a user to set preferences through an external device or software application and would extend the capabilities of UE 1500 by providing for information or software downloads to UE 1500 other than through a wireless communication network. The alternate download path may for example be used to load an encryption key onto the device through a direct and thus reliable and trusted connection to thereby enable secure device communication. As will be appreciated by those skilled in the art, serial port 1530 can further be used to connect the UE to a computer to act as a modem.

Other communications subsystems 1540, such as a short-range communications subsystem, is a further optional component which may provide for communication between UE 1500 and different systems or devices, which need not necessarily be similar devices. For example, the subsystem 1540 may include an infrared device and associated circuits and components or a Bluetooth™ communication module to provide for communication with similarly enabled systems and devices. Subsystem 1540 may further include non-cellular communications such as WiFi or WiMAX.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a network element within a secondary cell for self-optimizing operation with a primary cell, the method comprising:

transmitting using an initial transmit power from the network element within the secondary cell;

requesting feedback from sensors of sensing measurements of transmissions received from the network element, the sensors located near a location in a region correlated with the primary cell;

receiving the feedback from the sensors; and adjusting a transmit power of the network element based on the received feedback.

2. The method of claim 1, wherein the initial transmit power is provided by at least one of a network, spectrum management entity or radio resource management entity.

3. The method of claim 1, wherein the location is a reference point in or about the primary cell.

4. The method of claim 1, wherein the location is a reference point in or about the secondary cell.

5. The method of claim 1, wherein the feedback received is weighted based on a distance from the sensing user equipment to the location.

6. The method of claim 1, wherein the feedback received is weighted by a confidence value assigned to the sensor.

7. The method of claim 6, wherein the confidence value is based on a correlation of signal to interference noise ratio measurements between sensors and a reference user equipment in the location.

8. The method of claim 6, wherein the confidence value is based on a pass loss between the sensor and the secondary cell.

9. The method of claim 1, wherein the adjusting is iterative based on further received feedback.

10. The method of claim 1, wherein the secondary cell is selected based on a proximity to the primary cell.

11. The method of claim 1, wherein the receiving is over an analogue feedback channel.

12. A network element within a secondary cell for self-optimizing operation with a primary cell, the network element comprising:

a processor; and a communications subsystem, wherein the network element is configured to:

transmit within the secondary cell using an initial transmit power from the network element;

request feedback from sensors of sensing measurements of transmissions received from the network element, the sensors located near a location in a region correlated with the primary cell;

receive the feedback from the sensors; and adjust a transmit power of the network element based on the received feedback.

* * * * *